United States Patent
Livingston

(10) Patent No.: US 7,350,745 B2
(45) Date of Patent: Apr. 1, 2008

(54) APPARATUSES AND METHODS FOR APPLYING FORCES TO A STRUCTURE UTILIZING OSCILLATORY WING MOTIONS IN A FLUID

(76) Inventor: Donald S. Livingston, 4051 Ardo St., Fremont, CA (US) 94536

( * ) Notice: Subject to any disclaimer, the term of this patent is extended or adjusted under 35 U.S.C. 154(b) by 0 days.

(21) Appl. No.: 11/149,902

(22) Filed: Jun. 11, 2005

(65) Prior Publication Data

US 2007/0023569 A1    Feb. 1, 2007

(51) Int. Cl.
 *B64C 33/02* (2006.01)
(52) U.S. Cl. ............ 244/22; 244/72; 74/84 S; 440/13; 416/83
(58) Field of Classification Search ......... 244/11, 244/22, 72; 446/39, 313; 440/32, 21, 13; 416/74, 75, 83; 74/84 S
See application file for complete search history.

(56) References Cited

U.S. PATENT DOCUMENTS

| 1,980,002 | A | * | 11/1934 | Savidge ............... 244/11 |
| 2,017,534 | A | * | 10/1935 | Gray ............... 244/22 |
| 2,218,599 | A | * | 10/1940 | Brunner ............... 244/72 |
| 3,085,355 | A | * | 4/1963 | Carpenter et al. ........ 434/54 |
| 4,428,550 | A | * | 1/1984 | Evans et al. ............ 244/93 |
| 4,525,123 | A | * | 6/1985 | Curci ............... 416/115 |
| 5,135,356 | A | * | 8/1992 | Shepherd ............ 416/114 |
| 5,149,023 | A | * | 9/1992 | Sakurai et al. ......... 244/229 |
| 6,206,324 | B1 | * | 3/2001 | Smith ............... 244/72 |
| 6,565,039 | B2 | * | 5/2003 | Smith ............... 244/72 |
| 6,568,634 | B2 | * | 5/2003 | Smith ............... 244/72 |
| 6,676,669 | B2 | * | 1/2004 | Charles et al. ......... 606/130 |
| 2003/0039489 | A1 | * | 2/2003 | Obrien et al. .......... 399/316 |
| 2004/0195436 | A1 |  | 10/2004 | Sinclair |
| 2006/0259019 | A1 | * | 11/2006 | Sanchez et al. ......... 606/1 |
| 2007/0157864 | A1 | * | 7/2007 | Aldin et al. ........... 114/281 |

FOREIGN PATENT DOCUMENTS

| GB | 25190 | 11/1911 |
| GB | 158228 | 1/1920 |
| GB | 173469 | 12/1920 |

OTHER PUBLICATIONS

Sanjay P. Sane & Michael H. Dickinson, The aerodynamic effects of wing moton and a revised quasi-steady model of flapping flight, Jan. 30, 2002.
Sanjay P. Sane, The aerodynamic of insect flight, Aug. 12, 2003, The Journal of Experimental Biology 206, 4191-4208.

* cited by examiner

*Primary Examiner*—Rob Swiatek
(74) *Attorney, Agent, or Firm*—Heimlich Law; Alan Heimlich, Esq.

(57) ABSTRACT

Methods and apparatuses are disclosed that rotate a first member about a first point relative to a chassis, wherein the first member is rotatably coupled to a second member at a second point. A second member is counter-rotated at a ratio of the rotational speed of the first member wherein the second member is rotatably coupled to the third member at a third point. The third point is translated in response to the counter-rotating second member in oscillatory motion along a path. The third member is pivoted at a third point and fluid is moved in response to the motion of the third member. A force is applied to the chassis due to the interaction of the third member and the fluid.

36 Claims, 33 Drawing Sheets

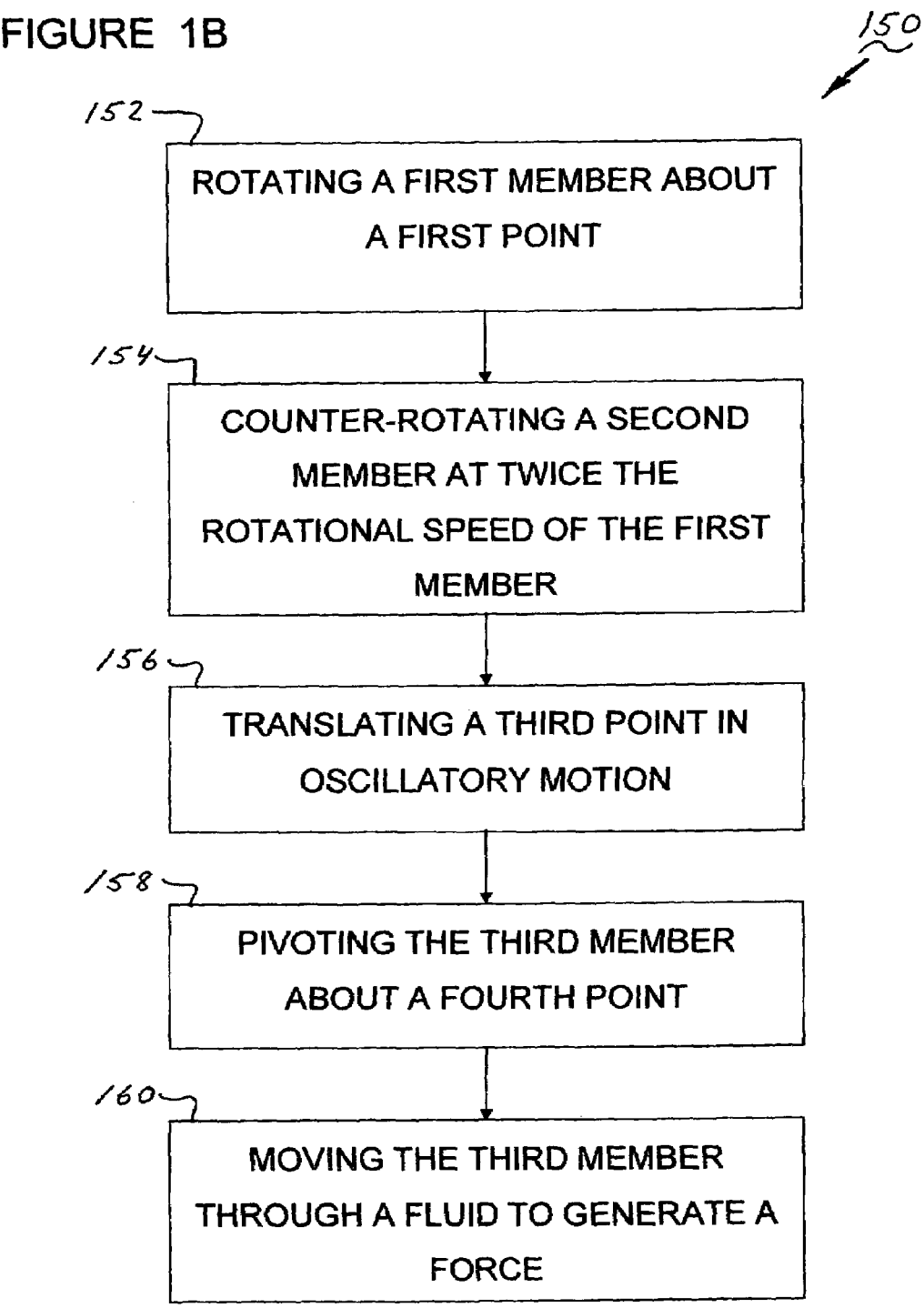

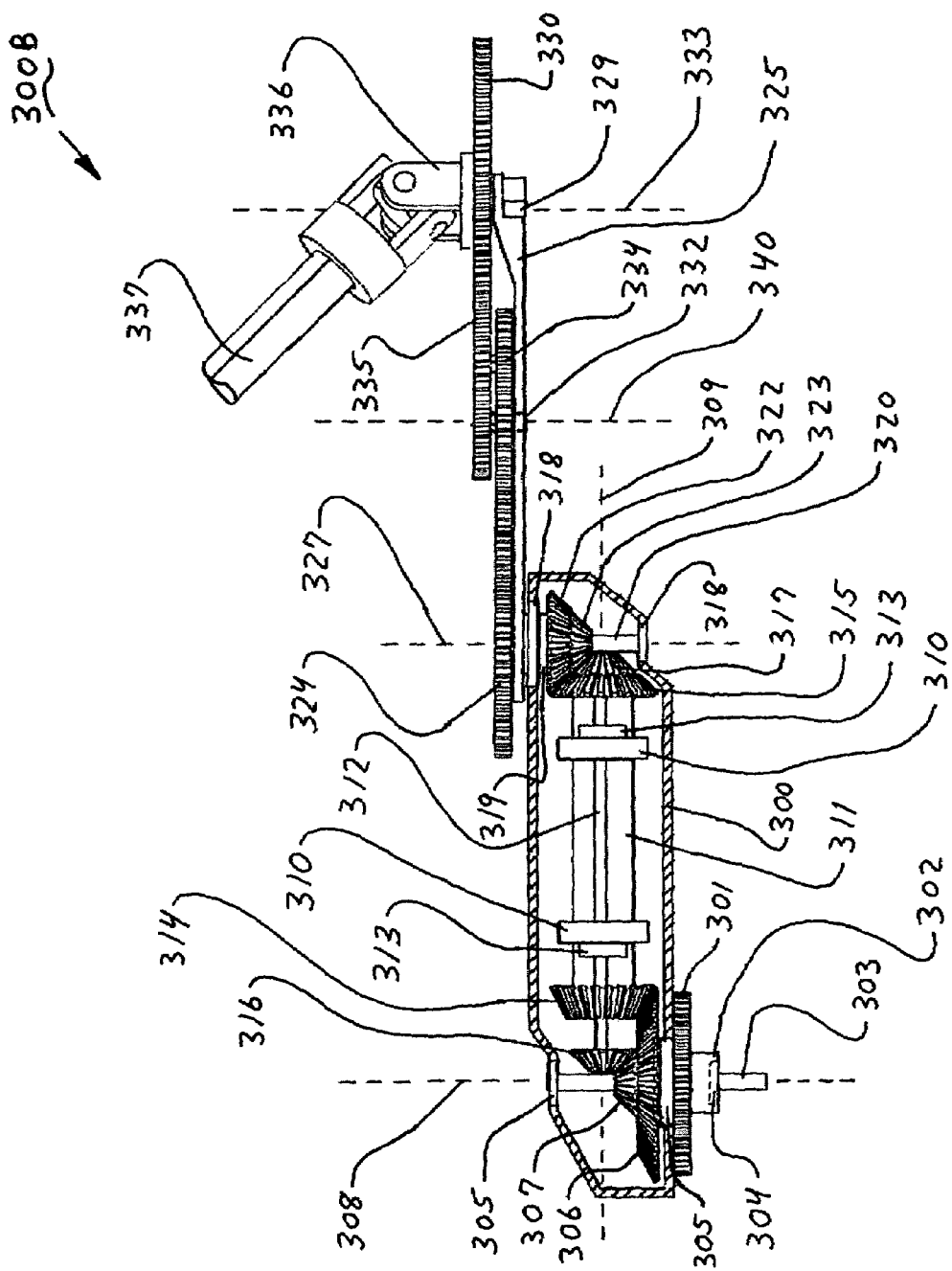

APPARATUSES AND METHODS FOR APPLYING FORCES TO A STRUCTURE UTILIZING OSCILLATORY WING MOTIONS IN A FLUID

BACKGROUND OF THE INVENTION

1. Field of Invention

Embodiments of the invention relate generally to methods and apparatuses that develop forces on a wing and, more specifically, to methods and apparatuses for generating lift utilizing oscillatory wing motions.

2. Art Background

Both fixed wing and rotary wing aircraft, such as airplanes and helicopters, employ fluid flow over a foil such as a wing or rotor, thereby producing the lift necessary to enable flight. Such flow occurs over a cambered surface at a relatively low angle of attack.

Fixed wing aircraft are able to fly at high speeds but require a runway in order to attain sufficient speed to create enough lift to become airborne. This can be a problem when it is desirable to operate such an aircraft on a runway of limited length. Also, it is difficult to build a fixed wing aircraft that can hover. One example is a Harrier Jet. Such a vertical takeoff jet requires a large amount of fuel to hover. The hover time is limited and a large amount of water is required to keep the jet engine cool during that time. Additionally, the surface of the ground beneath the jet during takeoff must be able to withstand the heat of the jet exhaust when the aircraft is executing a vertical takeoff. All of these aspects either singly or in combination may present a problem.

Rotary wing aircraft, on the other hand, are able to become airborne without a runway, yet these aircraft are unable to attain the high speeds of fixed wing aircraft. This may present a problem.

Rotary wing aircraft utilize a foil at a relatively low angle of attack to the flow and as the name "rotary" implies, constrain the foil to rotate about a fixed axis. Additionally, a rotary wing aircraft employs a tail rotor to prevent counter rotation of the vehicle. Such constraints of angle of attack, rotation of the foil about a fixed axis, tail rotor, etc. place design constraints on resulting vehicle designs that use a rotary foil. This may present a problem.

BRIEF DESCRIPTION OF THE DRAWINGS

The invention may best be understood by referring to the following description and accompanying drawings that are used to illustrate embodiments of the invention. The invention is illustrated by way of example in the embodiments and is not limited in the figures of the accompanying drawings, in which like references indicate similar elements.

FIG. 1B illustrates a process for flight, according to one embodiment.

FIG. 3B illustrates a top down, partial cross-sectional view of the wing drive unit from FIG. 3A.

DETAILED DESCRIPTION

In the following detailed description of embodiments, reference is made to the accompanying drawings in which is shown by way of illustration, specific embodiments in which the invention may be practiced. These embodiments are described in sufficient detail to enable those of skill in the art to practice the invention. In other instances, well-known structures and techniques have not been shown in detail in order not to obscure the understanding of this description. The following detailed description is, therefore, not to be taken in a limiting sense, and the scope of the invention is defined only by the appended claims.

In various embodiments, apparatuses and methods are disclosed to create forces between a fluid and a structure, such as a member, by utilizing motions that rotate and translate the member simultaneously during oscillatory motion. In various embodiments, oscillatory translational wing motions incorporate variable pitch angles of large amplitude and/or variable stroke plane angles.

Figure 1A:
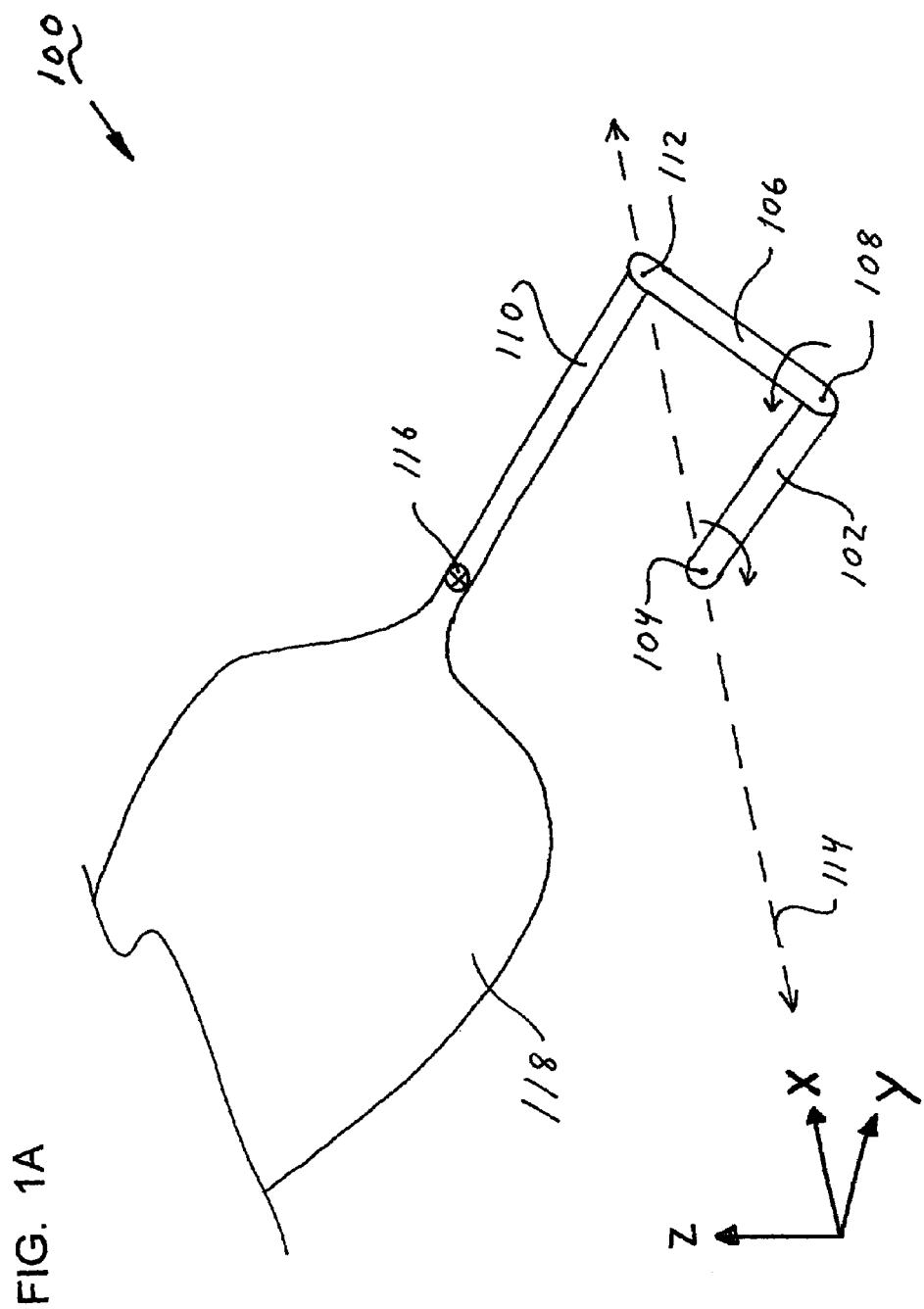
FIG. 1A illustrates one embodiment of a wing drive unit.

FIG. 1A illustrates one embodiment of a wing drive unit generally at 100. With reference to FIG. 1A, a first member 102 is rotated about a first point 104. For clarity of illustration, the first member 102 is rotatably coupled to a chassis (not shown) at the first point 104. A second member 106 is rotatably coupled with the first member 102 at a second point 108. A third member 110 is rotatably coupled to the second member 106 at a third point 112. The third member 110 is pivotally supported by the chassis (not shown) at a fourth point 116.

The first member 102 can be rotated either clockwise or counter-clockwise about the first point 104. In one embodiment, the first member is rotated clockwise about the first point 104 as indicated by an arrow (about the first point 104) at an arbitrary rate of n revolutions per unit time. The second member 106 is configured for rotation in a direction counter to the direction of rotation of the first member 102. A rate of rotation of the second member 106 is related to a rate of rotation of the first member 102. In one embodiment, the second member rotates in the counter-clockwise direction at a rate of 2n revolutions per unit time, as indicated by an arrow about the second point 108.

The third point 112 travels in oscillatory motion along a trajectory indicated by a path 114. The path 114 can be a linear path (as indicated in FIG. 1A) if a distance between the first point 104 and the second point 108 is equal to a distance between the second point 108 and the third point 112. If these distances are not equal, then the path will follow a curve, which will have an amplitude above the path 114 during one-half cycle of the oscillatory motion and an amplitude below the path 114 during the other half cycle of the oscillatory motion, with end points of the curve falling on the path 114.

The third member 110 is driven in oscillatory motion at the third point 112. While in oscillatory motion, the third member 110 is configured to rotate about its longitudinal axis, thereby changing an angle of attack of a foil portion 118 relative to a fluid that the foil portion 118 moves through. The resulting motion of the foil in the immersed fluid creates a lift force that is imparted to the chassis. In the context of this description of embodiments, the foil portion 118 can also be referred to as a "wing portion." The term "fluid," is used generically to refer to a fluid such as water (fresh water or saltwater), oil, etc. or a gas such as air. For the remainder of this description, "pitch angle" will be used rather than "angle of attack" to describe the orientation of the wing. Pitch angle refers to the angle of the wing, as referenced from the chassis, and will be described further below. It will be noted that changing a pitch angle of the wing changes an angle of attack of the wing to the fluid.

FIG. 1B illustrates a process for flight, according to one embodiment, generally at 150. In conjunction with the description provided above in relation to FIG. 1A and with reference to FIG. 1B, rotary motion is converted into linear motion that is used to "drive" or "move" a foil or wing through a fluid. In block 152 a first member is rotated about a first point. In block 154 a second member is counter-rotated about a second point at twice the rotational speed of the first member which results in translating a third point in oscillatory motion at block 156. A foil or wing member can be pivoted about a fourth point at block 158 to move the third member through a fluid at block 160; thereby creating forces, such as lift forces, that are transferred to a chassis. The motion of the chassis through the fluid can be controlled by large amplitude motions of the foil or wing member relative to the chassis as well as large variations of pitch angle during the motion of the wing through its stroke plane.

Figure 2:
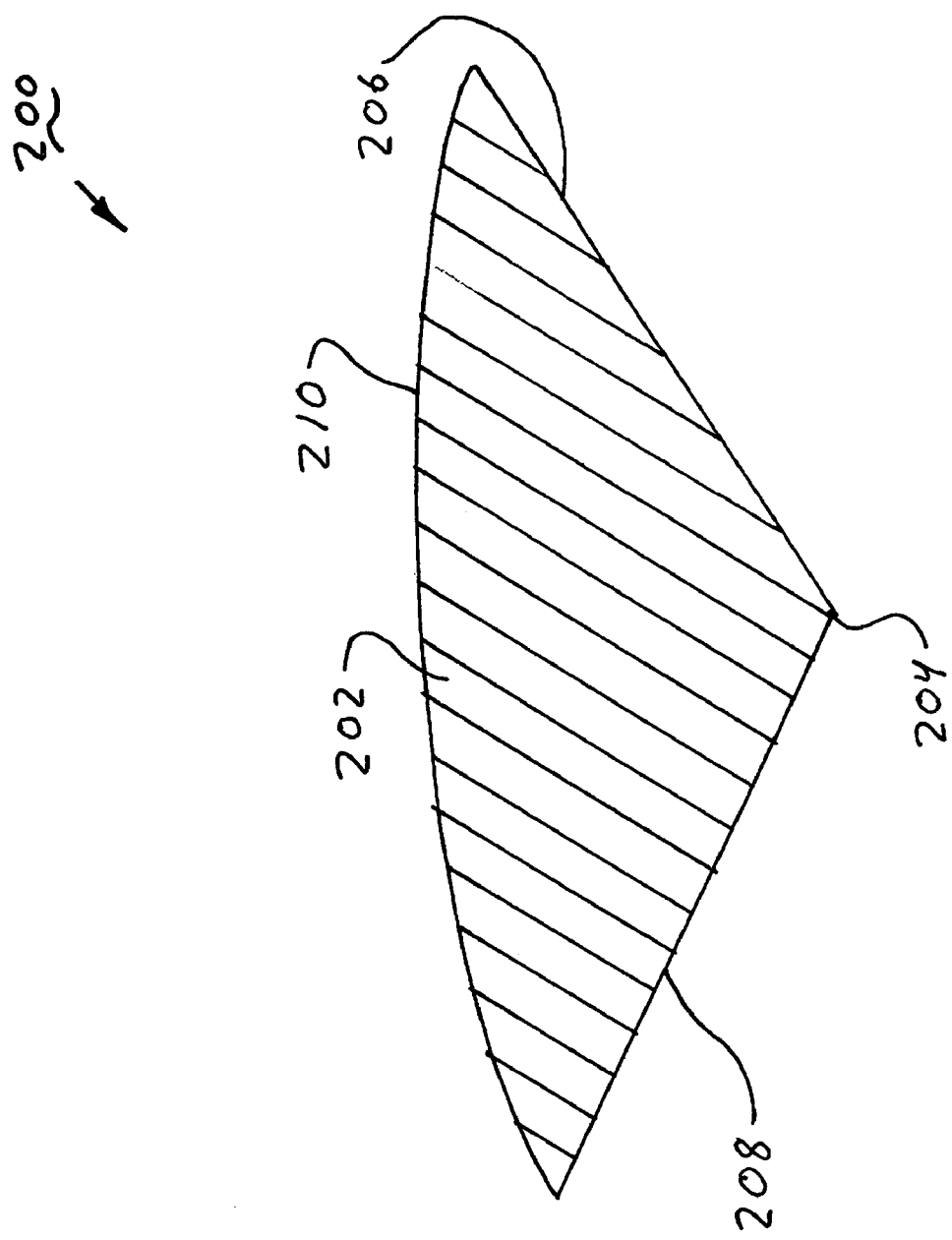
FIG. 2 illustrates one embodiment of a stroke plane.

FIG. 2 illustrates one embodiment of a stroke plane generally at 200. With reference to FIG. 2, a stroke plane is indicated at 202. The stroke plane 202 defines a plane through which a wing member, such as the wing member 118, oscillates within. A boundary 206 represents a first extreme position of the corresponding wing member at one end of a range of oscillatory motion while a boundary 208 represents a second extreme position of the corresponding wing member at a second end of the range of oscillatory motion. The boundary 210 represents a path taken by the wing tip during the oscillatory motion.

An orientation of the stroke plane 202 can be referred to by two angles: a stroke path angle and a wing dihedral angle. The stroke path angle is defined by a path that one end of the wing is driven within, such as the path 114 (FIG. 1A), relative to a chassis that the wing is attached to.

A wing dihedral angle is measured between the average orientation of a wing and a horizontal plane of the chassis. Referring back to FIG. 1A, movement of the point 116 along the Z axis changes a wing dihedral angle of the wing 118 relative to the chassis (not shown). For the purpose of referencing the wing dihedral angle in this example, the plane of the chassis can be considered to be parallel to the XY plane.

Figure 3A:
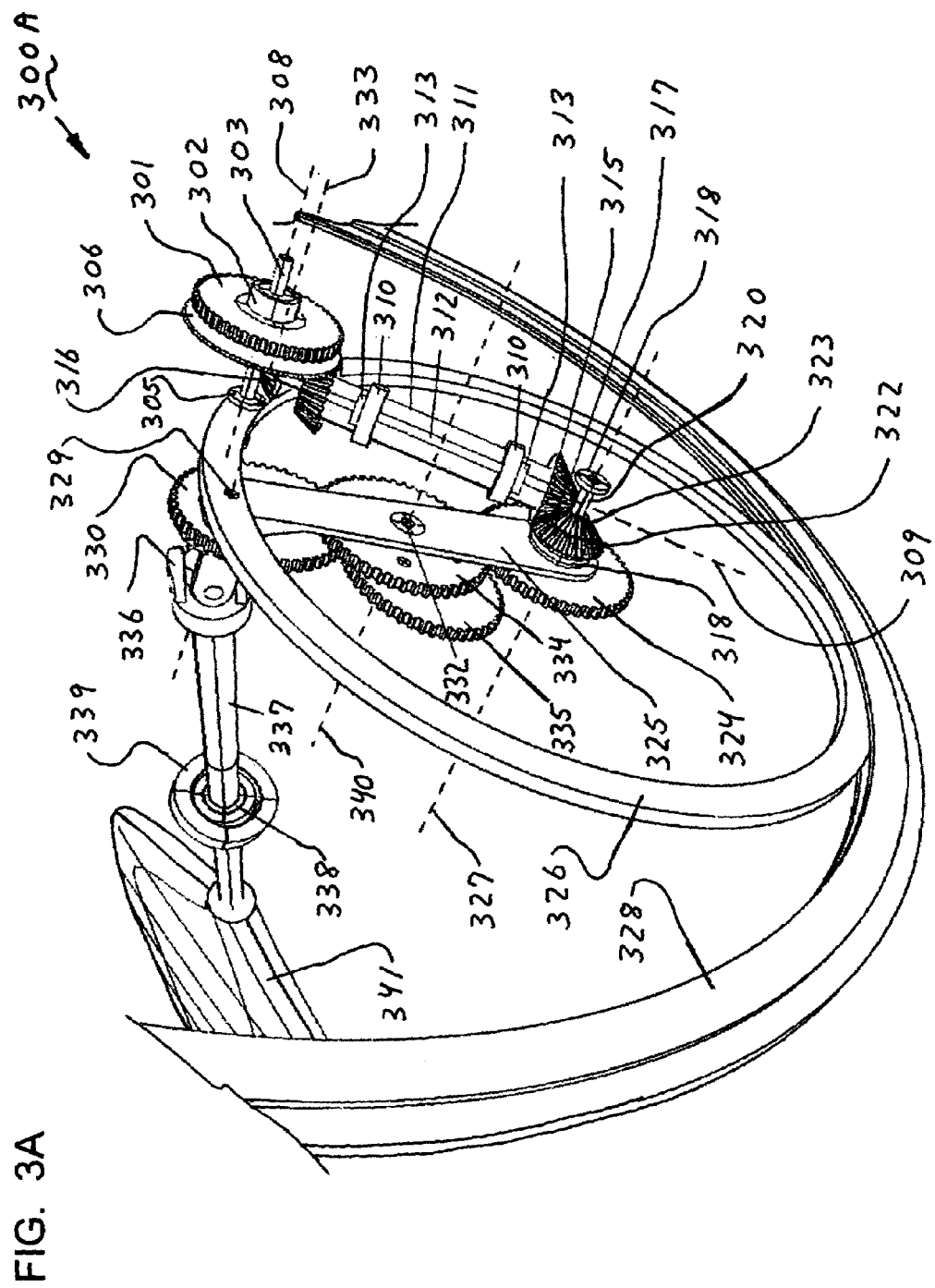
FIG. 3A illustrates one embodiment of a wing drive unit in perspective view.
Figure 3C:
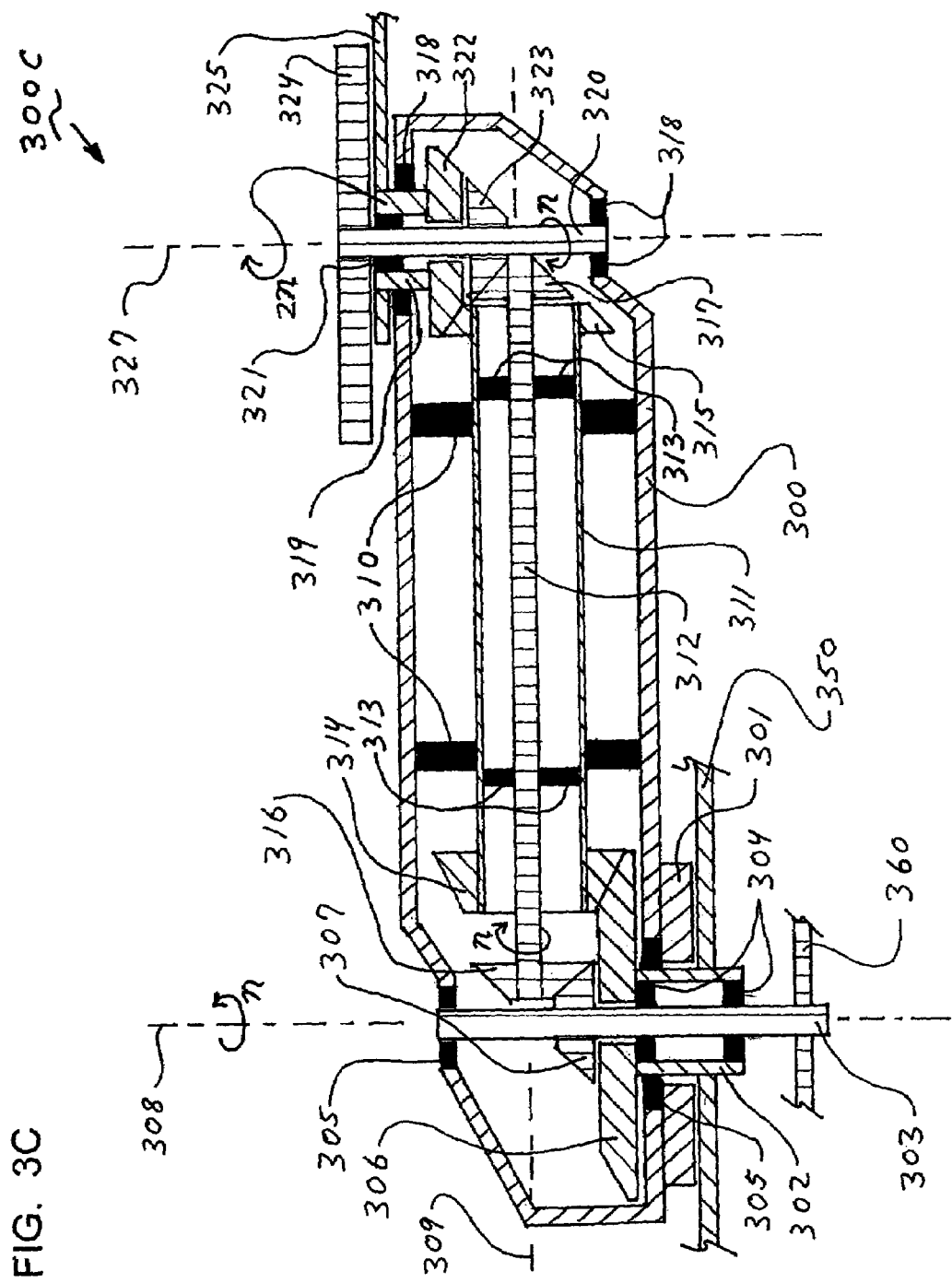
FIG. 3C illustrates a cross-sectional view of a portion of the wing drive unit shown in FIG. 3B.
Figure 3D:
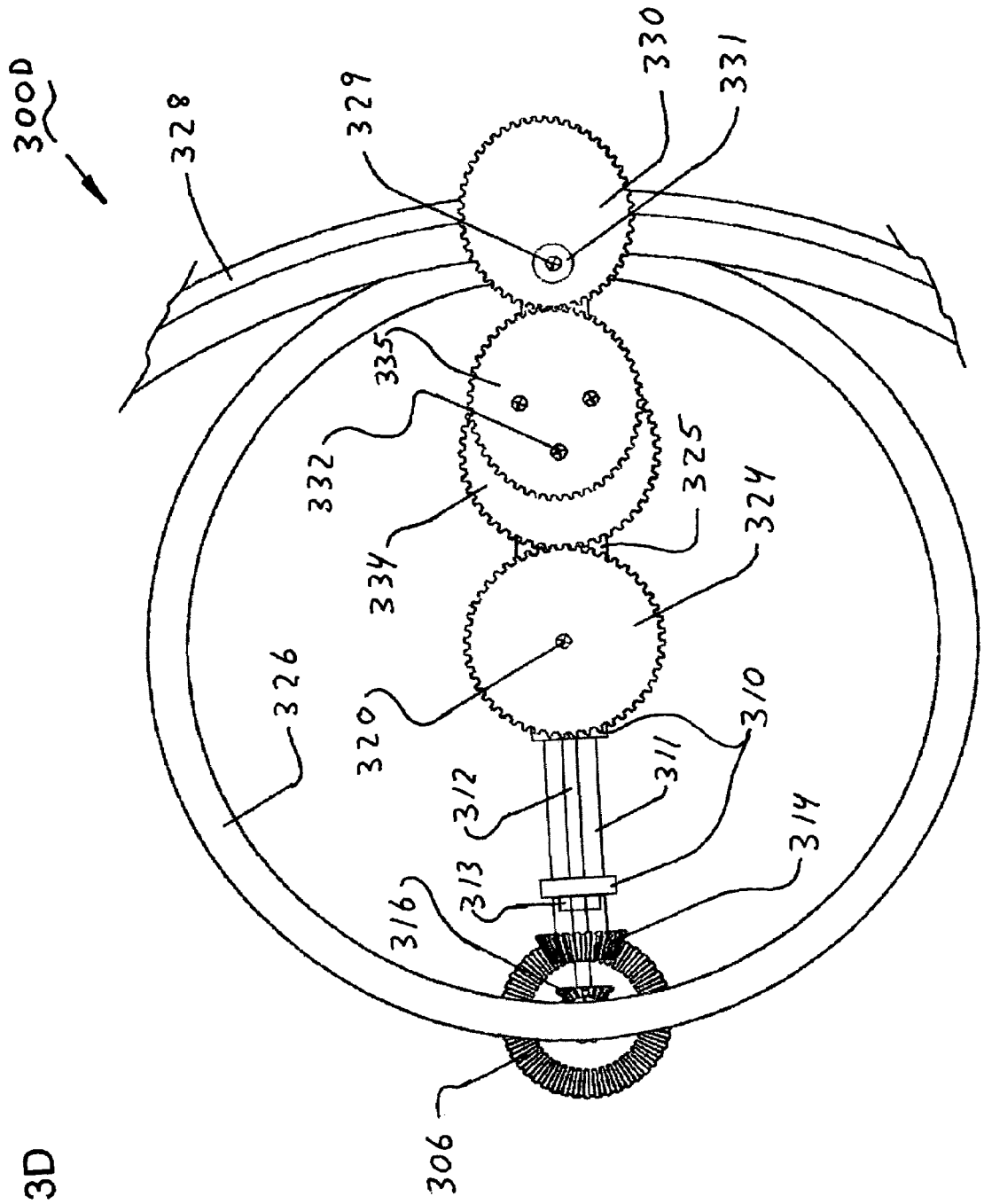
FIG. 3D shows a front view of the wing drive unit shown in FIG. 3A.

FIG. 3A illustrates one embodiment of a wing drive unit in perspective view generally at 300A. FIG. 3B illustrates a top down, partial cross-sectional view of the wing drive unit from FIG. 3A, generally at 300B. FIG. 3C illustrates a cross-sectional view of the wing drive unit shown in FIG. 3B, generally at 300C. FIG. 3D shows a front view of a portion of the wing drive unit shown in FIG. 3A.

Referring to FIG. 3C, in one embodiment a first axle 303 is releasably coupled to a chassis at 360. The first axle 303 is rotatably mounted in a first tube with bearings 304. The first tube 302 is releasably coupled to the chassis at 350. A first member 300 is rotatably coupled to the first tube 302 and the first axle 303 with bearings 305. A gear 301 is attached to the first member 300. In one embodiment, the gear 301 is a spur gear. In one embodiment, the gear 301 is used to rotate the first member 300 about an axis 308 of the first axle 303 and the first tube 302.

Coupled to the first tube 302 is a gear 306. In one embodiment, the gear 306 is a 30 degree bevel gear. The gear 306 meshes with a gear 314. In one embodiment, the gear 314 is a 60 degree bevel gear. The gear 314 is attached to a tube 311. The tube 311 is rotatably mounted within the first member 300 with bearings 310 and is configured to rotate about an axis 309.

A gear 324 is attached to a second axle 320. In one embodiment, the gear 324 is a spur gear. The second axle 320 is rotatably mounted in a second tube 319 with bearings 321. The second axle 320 is rotatably mounted to rotate about an axis 327 and the second axle is coupled to a gear 323. In one embodiment, the gear 323 is a 45 (forty-five) degree miter gear.

In one embodiment, the second tube is rotatably mounted in the first member 300 with a first bearing 318 and the second axle is rotatably mounted in the first member 300 with a second bearing 318. The second tube 319 is coupled to a gear 322 and the second tube 319 is coupled to a second member 325. In one embodiment, the gear 322 is a 45 (forty-five) degree miter gear.

It is understood, that the first member 300, can be rotated in either a clockwise or counter-clockwise direction around the axis 308. A rotational speed of the second member 325 is related to a rotational speed of the first member 300. The description that follows is directed to counter-clockwise rotation of the first member 300 about the axis 308.

The second member 325 is configured to rotate in a direction counter to the rotation of the first member 300. In one embodiment, rotation of the first member 300 about the axis 308 in a counter-clockwise direction at a speed of n revolutions per unit time, as indicated by an arrow around the axis 308, results in rotation of the tube 311, in a clockwise direction, at a speed of 2n when the axis 309 is observed from an end that a gear 315 is attached. In one embodiment, the gear 315 is a 45 (forty-five) degree miter gear. The second axle counter-rotates (relative to the rotation of the first member 300) in a clockwise direction about the axis 327.

Referring back to the first axle 303, a gear 307 is coupled thereto. In one embodiment, the gear 307 is a 45 (forty-five) degree miter gear. A third axle 312 is rotatably mounted within the tube 311 with bearings 313. The third axle 312 is coupled to gears 316 and 317. In one embodiment, the gears 316 and 317 are 45 (forty-five) degree miter gears. The gear 307 meshes with the gear 316 and the gear 317 meshes with the gear 323.

Rotation of the first member 300 in the counter-clockwise direction causes the second axle 320 to counter-rotate in the clockwise direction as indicated by an arrow around the second axle 320. Counter-rotation of the second axle 320 causes the gear 324 to maintain its rotational orientation relative to the chassis, since the gear 324 counter-rotates around the axis 327 at a rate of n revolutions per unit time. It will be noted that while the gear 324 rotates around the axis 308 at a rate of n, the counter-rotation of the gear 324 around the axis 327 at the same rate n (however different in direction) cancels out any effective change in angular orientation of the gear 324 relative to the chassis.

With reference to FIG. 3B, a gear 334 is rotatably mounted via a shaft 332 to the second member 325 and the gear 334 is configured to rotate around an axis 340. In one embodiment, the gear 334 is circular. A gear 335 is coupled to the gear 334. In various embodiments, the gear 335 is circular or non-circular (such as elliptical) and the gear 335 does not have to be mounted on its center. A gear 330 is selected to match the shape of the gear 335. The gear 330 is rotatably coupled to the second member 325 to rotate around an axis 333. In one or more embodiments, the gears 335 and 330 are unilobe elliptical gears that are mounted off axis with the same angular orientation (FIG. 3D). Such a configuration provides for a pitch angle that varies during the oscillatory motion of a third member 337 (FIG. 3A and FIG. 3B).

Referring now to FIG. 3A, the third member 337 is rotatably coupled via a universal joint 336 to the second member 325 at a third point that is coincident with the axis 333 of an axle 329. The axle 329 is rotatably mounted in the second member 325 with a bearing 331 (FIG. 3D). The third point (coincident with the axis 333) moves in oscillatory motion, following a path, as described above in conjunction with FIG. 1A. The path is linear when a distance between the axis 308 and the axis 327 is equal to a distance between the axis 327 and the axis 333. If the distances are not equivalent, then the path will be curved as described above in conjunction with FIG. 1A.

In one embodiment, the third member 337 is pivotally supported by a pivot point 338/339. In one embodiment, 338 is a bearing. In one embodiment, the bearing 338 is a linear-rotary bearing. In one embodiment, 339 is a coupling. In one embodiment, the coupling 339 is a universal lateral coupling. The third member 337 has a wing portion 341. The orientation of the path, described immediately above, and a position of the pivot point 338/339, relative to a chassis, define a stroke plane for the wing portion 341. Referring back to FIG. 3C, an angle between the stroke plane and the chassis can be changed by rotating the first tube 302 relative to the chassis at 350. Such a relative rotation between the first tube 302 and 350 (at a fixed angle between the first member 300 and the chassis) causes an angle formed between the first member 300 and the second member 325 to change, thereby changing the angle between the stroke plane and the chassis.

Adjustment of the median pitch angle or instantaneous pitch angle is accomplished by rotating the first axle 303 relative to the chassis at 360. Rotation of the first axle 303 causes a corresponding rotation of the third member 337 (FIG. 3A and FIG. 3B), thereby the pitch angle of the third member 337 and wing portion 341 can be adjusted. It will be noted that in some embodiments a pitch angle of a third member and wing portion oscillate about a mean position utilizing gears that have been mounted off center and/or are non-circular, such as elliptical in shape.

With reference to FIG. 3D, it will be noted that the gear 324 and the gear 330 do not gain a net rotation with respect to the chassis. However, the rate of rotation of the gear 330 is not constant when the gear 330 is rotatably mounted on an axis that is not coincident with its geometrical center. In such a case, it will be noted that the gear 335 is likewise configured (mounted on an axis that is not coincident with its geometrical center). The gear 330 will rotate at a speed that slows down and speeds up in an oscillating fashion. When a distance between the axis 333 (FIG. 3B) of the gear 330 and the adjacent gear 335 is at a minimum, the rotation speed of the gear 330 is at a maximum. Conversely, when the distance between the axis 333 (FIG. 3B) of the gear 330 and the adjacent gear 335 is at a maximum, the rotation speed of the gear 330 is at a minimum. The resulting oscillation of the gear 330 produces an oscillating pitch angle of the wing portion 341 (FIG. 3A). Such an oscillation can be tailored by adjusting a distance that the gears 330 and 335 are mounted off of their geometrical centers.

In one embodiment, an example of a variable wing pitch angle is illustrated below in FIG. 11, where the wing pitch angle varies by approximately ±60 degrees. Embodiments of the present invention are not limited to the variation in wing pitch angle presented in this description. An unlimited number of different wing pitch angles can be achieved by application of the teaching presented herein. All such resulting wing pitch angles are within the scope of embodiments presented within this description of embodiments.

Referring back to FIG. 3A and FIG. 3D, in various embodiments, the first and second members can be supported by utilizing an inner circular member 326 and an outer circular member 328. The inner circular member 326 is coupled to the second member 325, such that the geometrical center of the inner circular member 326 is coincident with the axis 327. The inner circular member 326 has a radius equal to a distance between the axis 333 and the axis 327.

The outer circular member 328 has a geometrical center that is positioned to be coincident with the axis 308. The outer circular member 328 is attached to the chassis and the inner and outer circular members are configured for aligned rolling contact. In one embodiment, the inner circular member 326 rolls inside of the outer circular member 328 being supported thereby.

Figure 3E:
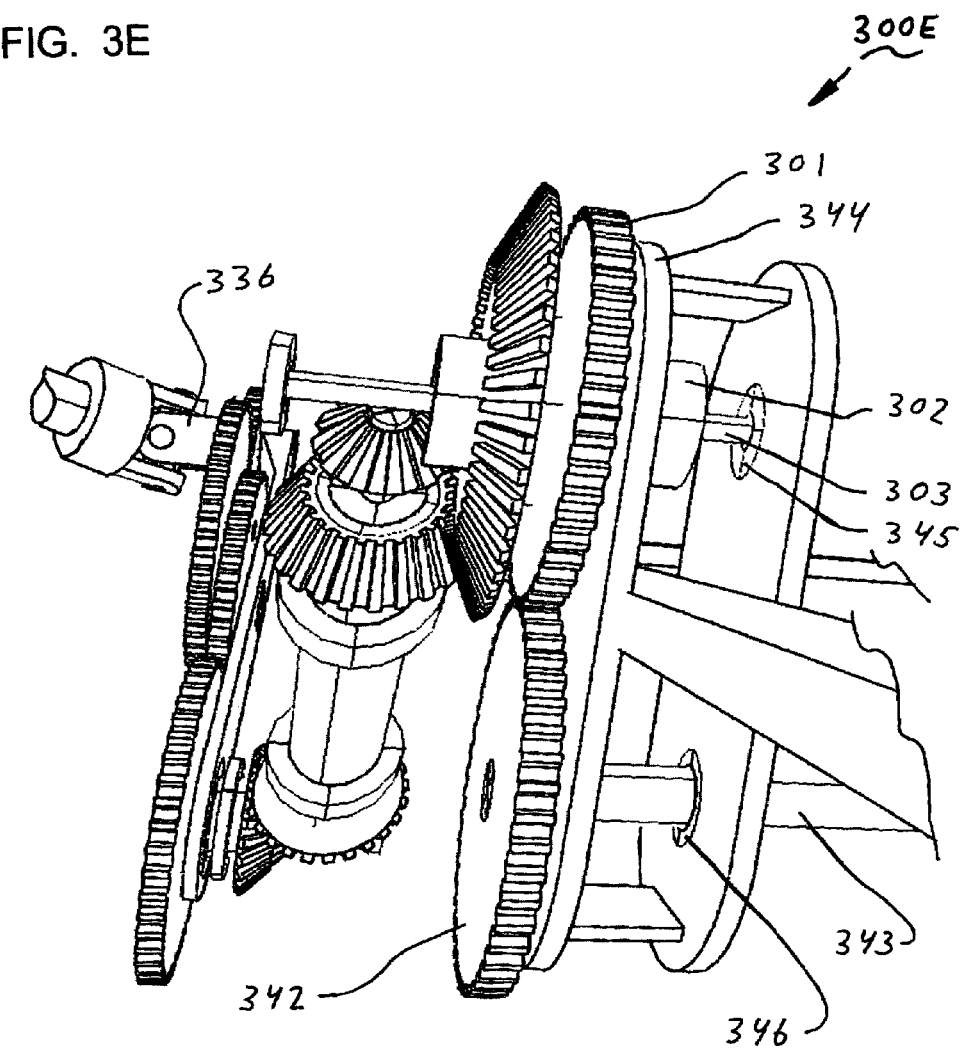
FIG. 3E illustrates one embodiment for connecting the wing drive unit of FIG. 3A to a chassis.

FIG. 3E illustrates one embodiment for connecting the wing drive unit of FIG. 3A to a chassis, generally at 300E. With reference to FIG. 3E, a rotating element 343 delivers power to the wing drive unit by means of rotation. In one embodiment, the rotating element 343 is a drive shaft. In another embodiment, the rotating element 343 is a flexible shaft configured in a housing. A bearing 346 provides for rotatable support of the rotating element 343 through a chassis 344. The rotating element 343 is coupled with a drive gear 342. In one embodiment, the drive gear 342 is a spur gear. The drive gear 342 meshes with and rotates the gear 301 which in turn causes the first member 300 (FIG. 3B and FIG. 3C) to rotate around the first axle 303 and the first tube 302. The first axle 303 is supported by a bearing 345 and the chassis 344. As previously described in conjunction with FIG. 3A, FIG. 3B, FIG. 3C, and FIG. 3D, the universal joint 336, which is coincident with the axis 333, travels in an oscillating path due to the application of power by means of rotating element 343. Thereby, the wing portion 341 is made to move through large amplitude motions, both along the stroke plane and rotation due to a variable pitch angle while in motion along the stroke plane.

Figure 4:
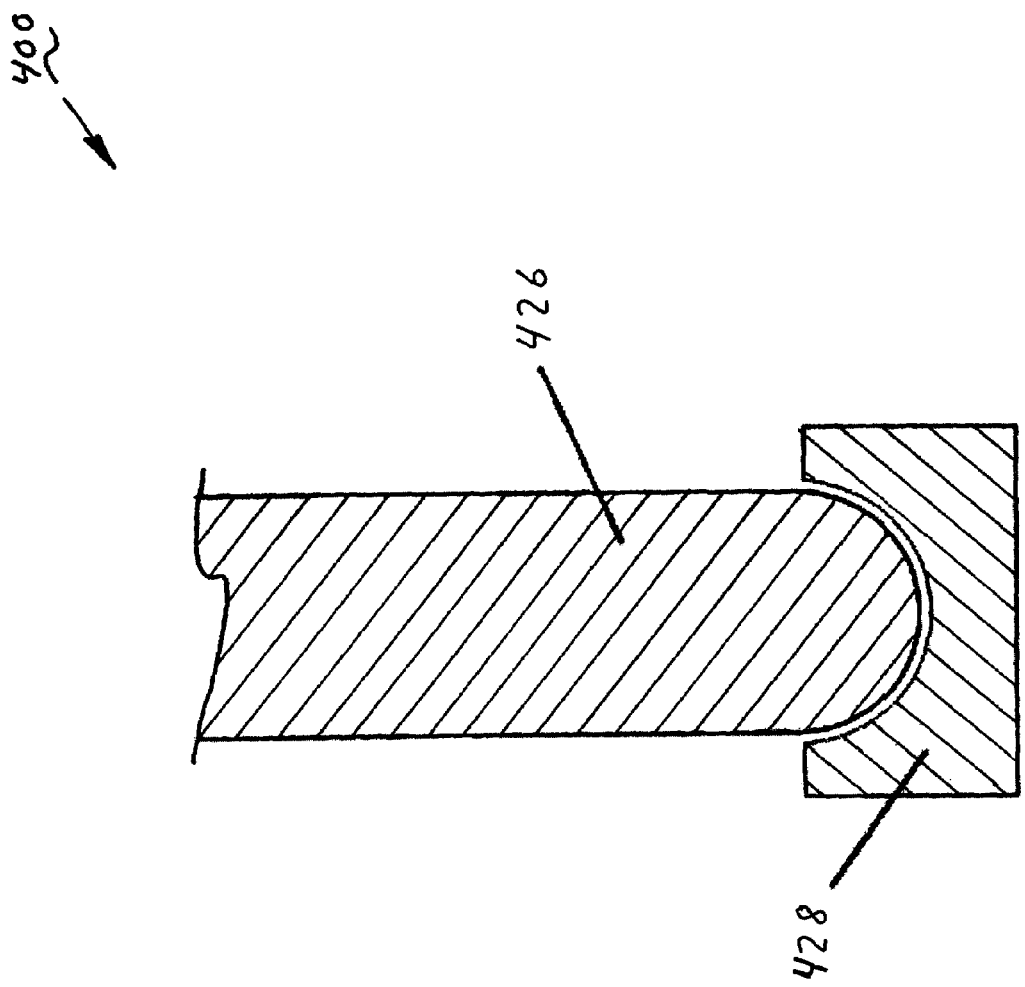
FIG. 4 shows, in cross section, one embodiment of circular members.

FIG. 4 shows, in cross section, one embodiment of circular members, generally at 400. With reference to FIG. 4, an inner circular member 426 is configured for rolling contact with an outer circular member 428. It will be noted that many configurations of such circular member cross-sectional shapes are possible and the illustration of FIG. 4 is but one example. Accordingly, all such other examples are within the scope of embodiments contemplated by this description.

Figure 5:
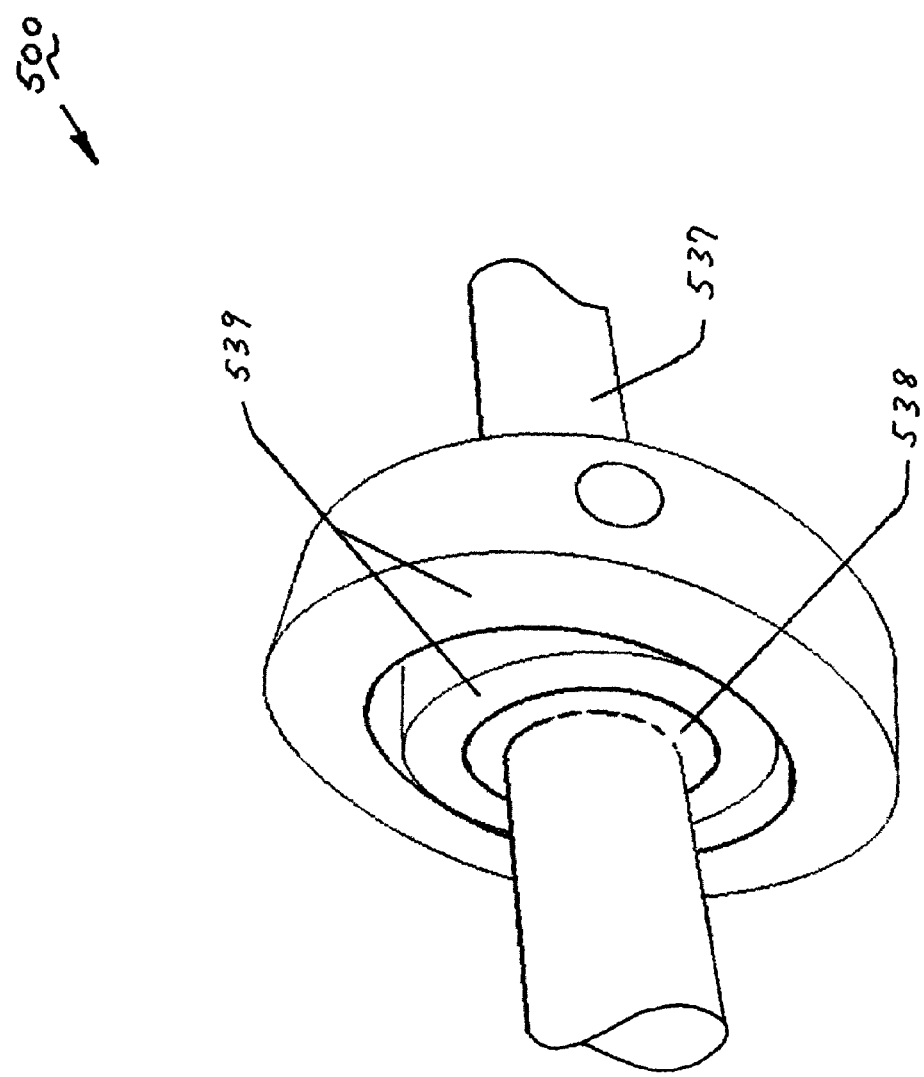
FIG. 5 illustrates one embodiment of a pivot point.

FIG. 5 illustrates one embodiment of a pivot point, generally at 500. With reference to FIG. 5, a member 537 is pivotally supported by a linear-rotary bearing 538 and a universal lateral coupling 539. Such a configuration permits rotation of the member 537 as well as repositioning of the member 537, for example, during oscillatory motion along a path as previously described above in conjunction with the preceding figures. Embodiments of the present invention are not limited by the way in which a member is pivotally supported. The example of FIG. 5 is but one example and other mechanisms can be used for pivotal support. For example, in another embodiment a pivotal support can include a gimbals and the member 537 can be telescopic.

Figure 6:
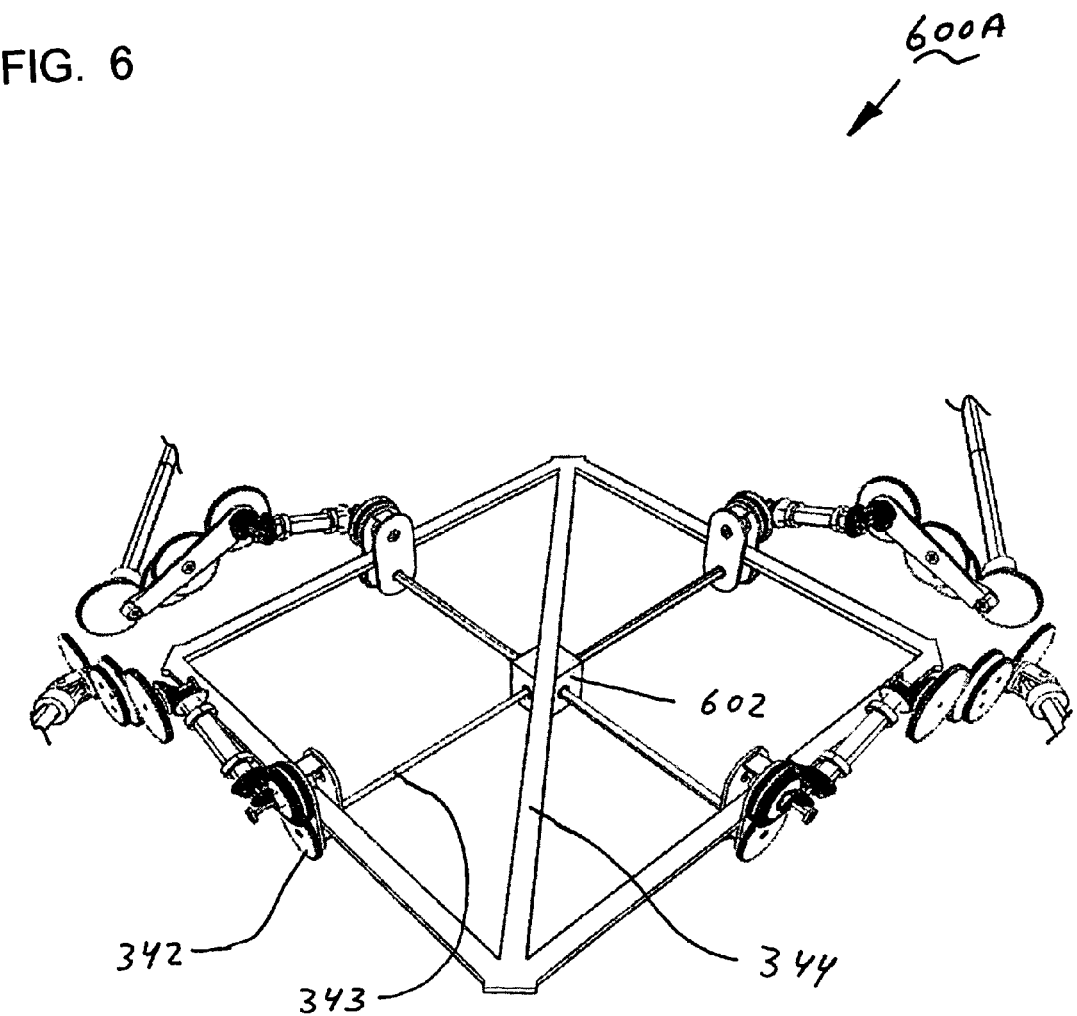
FIG. 6 illustrates one embodiment of a chassis.

FIG. 6 illustrates one embodiment of a chassis, generally at 600A. With reference to FIG. 6, a chassis 344 is configured with four wing drive units. A source of power 602 is centrally located on the chassis 344 and provides power to each wing drive unit through separate rotating elements, such as the rotating element 343 providing power to the drive gear 342.

In other embodiments, individual wing drive units can be powered from independent sources of power. In yet other embodiments, a group of wing drive units can be powered from an individual source of power. In yet other embodiments, multiple sources of power can be configured to power one or more wing drive units, thereby providing power redundancy.

Figure 7:
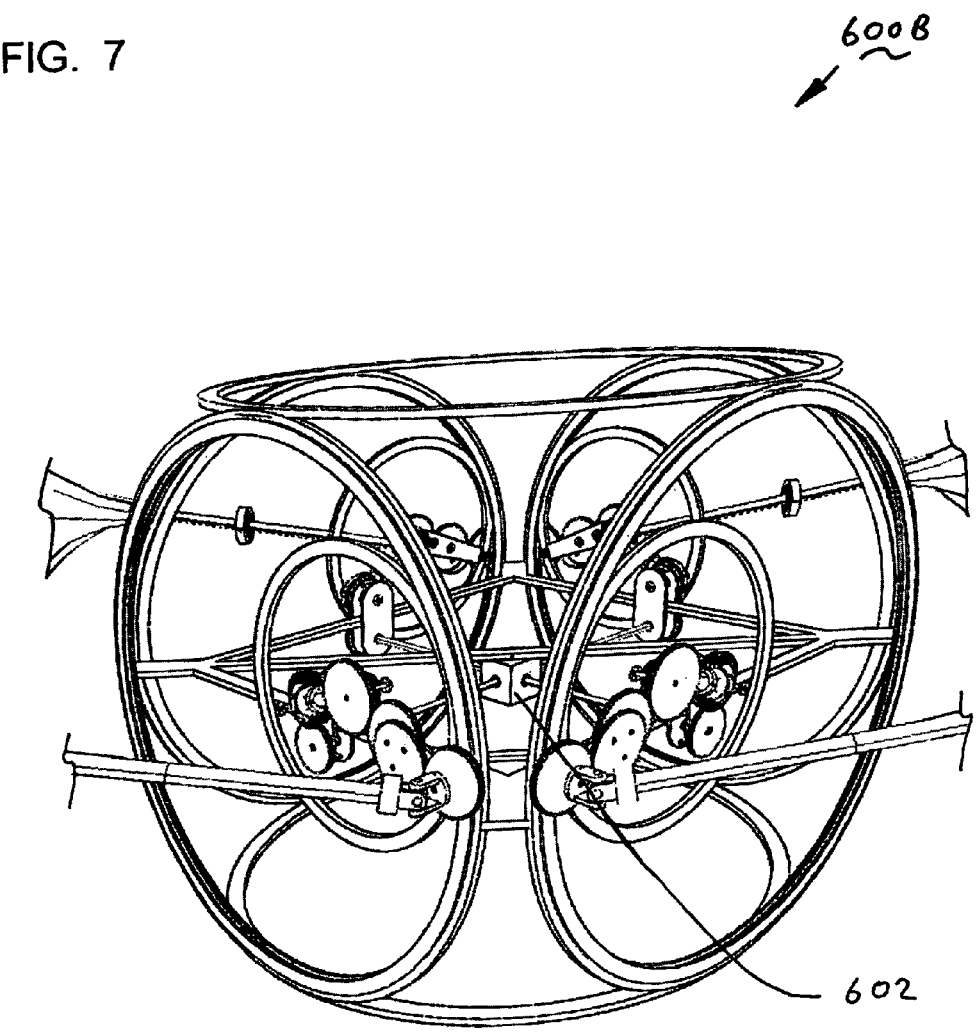
FIG. 7 illustrates one embodiment of incorporating circular members into a chassis.

FIG. 7 illustrates one embodiment of incorporating circular members into a chassis generally at 600B. With reference to FIG. 7, a source of power is centrally located at 602. The source of power 602 provides power to the four wing drive units, as shown in FIG. 6. Circular members provide support for the wing drive units and are configured into the chassis as shown in one embodiment. Alternatively, in other embodiments, individual sources of power can be supplied to the wing drive units or to a group of wing drive units.

Figure 8A:
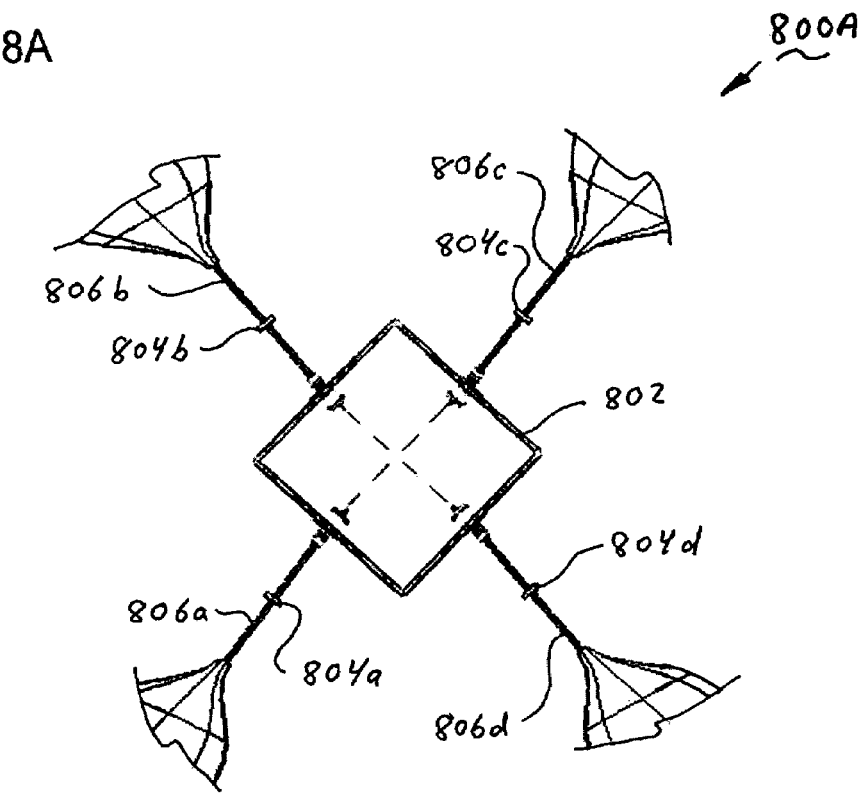
FIG. 8A illustrates a position of wing shaft pivot points configured for hovering, according to one embodiment.

FIG. 8A illustrates a position of wing shaft pivot points configured for hovering, according to one embodiment generally at 800A. With reference to FIG. 8A, four pivot points, 804a, 804b, 804c, and 804d are configured into a substantially uniform circumferential distribution about a chassis 802. A member 806a pivots about the pivot point 804a, the pivot point 804a is in a first location. A member 806b pivots about the pivot point 804b, the pivot point 804b is in a first location. A member 806c pivots about the pivot point 804c, the pivot point 804c is in a first location. A member 806d pivots about the pivot point 804d, the pivot point 804d is in a first location.

Figure 8B:
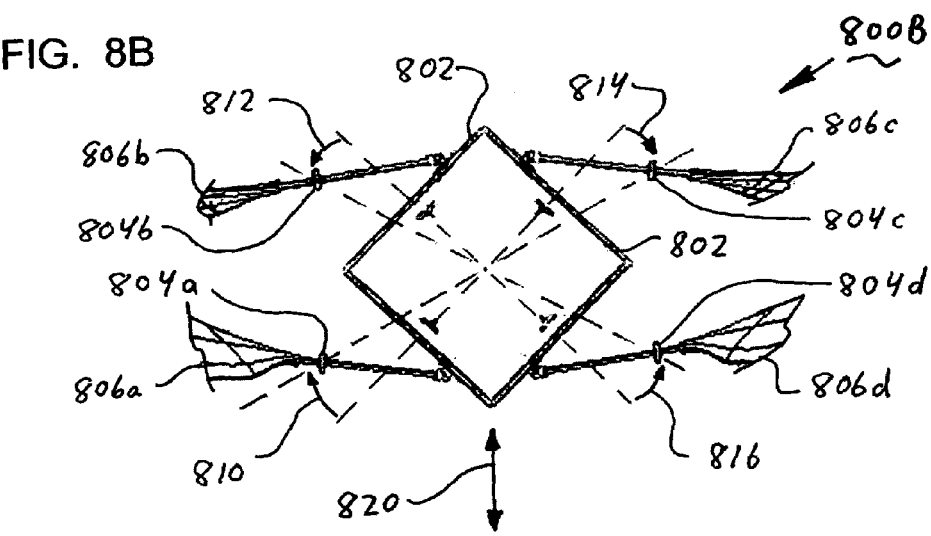
FIG. 8B illustrates a position of wing shaft pivot points configured for translational motion, according to one embodiment.

FIG. 8B illustrates a position of wing shaft pivot points configured for translational motion, according to one embodiment, generally at 800B. With reference to FIG. 8B, the pivot point 804a has moved to a second location as indicated by an arrow 810. The pivot point 804b has moved to a second location as indicated by an arrow 812. Members 806a and 806b form a wing pair on a first side of the chassis 802.

The pivot point 804c has moved to a second location as indicated by an arrow 814. The pivot point 804d has moved to a second location as indicated by an arrow 816. Members 806c and 806d form a wing pair on a second side of the chassis 802.

In various embodiments, translational motion along a direction indicated by an arrow 820 occurs with the pivot points 804a, 804b, 804c, and 804d configured as shown. It will be noted that other locations of the pivot points are possible for translational motion. No limitation is implied by the location of the pivot points 804a, 804b, 804c, and 804d as illustrated in FIG. 8B according to one example.

Figure 9A:
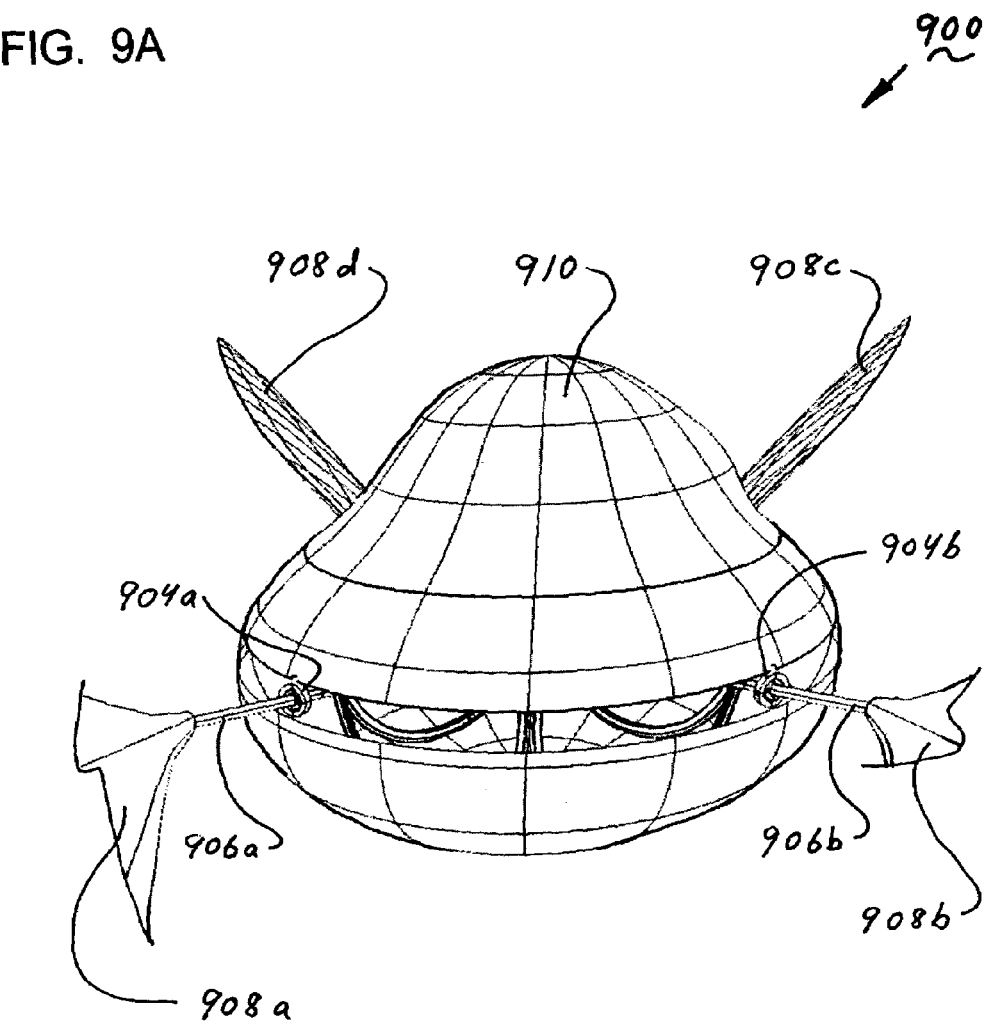
FIG. 9A depicts adjustable pivot points, according to one embodiment.

FIG. 9A depicts adjustable pivot points, according to one embodiment, generally at 900. With reference to FIG. 9A, four wing members, 908a, 908b, 908c, and 908d are shown connected to a chassis 910. The wing members are configured to be driven in oscillatory motion, as described above in conjunction with the preceding figures. An adjustable pivot point 904a is configured to permit a member 906a to be repositioned relative to a second pivot point 904b and its corresponding member 906b. Such repositioning of the pivot points 904a and/or 904b can be accomplished in a variety of ways, as is known to those of skill in the art, such as, but not limited to, by utilizing a movable track, a movable panel with a slot, etc.

Figure 9B:
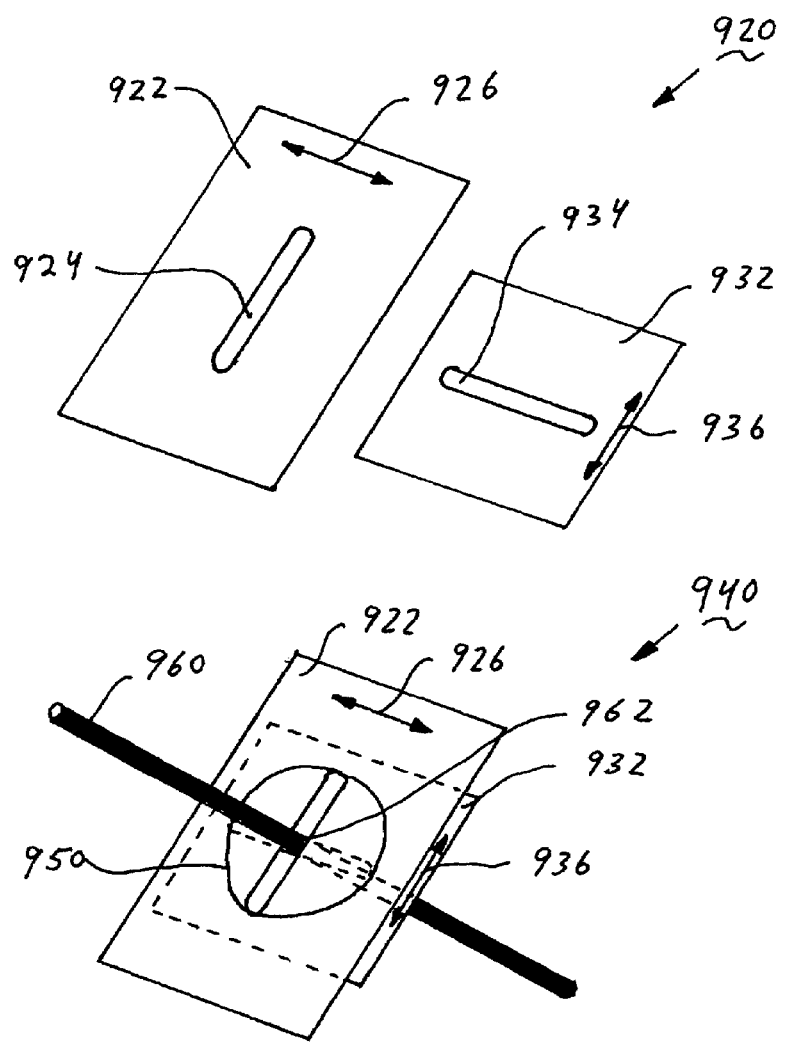
FIG. 9B depicts an adjustable pivot point, according to another embodiment.

In various embodiments, movement of a pivot point in two dimensions is also readily accomplished. In one embodiment, such movement is accomplished by combining multiple movable layers, such as two movable panels 922 and 932 as illustrated in FIG. 9B. With reference to FIG. 9B, in an exploded view 920, a first panel 922 has a slot 924 and a second panel 932 is configured with a slot 934 oriented at an angle, such as 90 (ninety) degrees relative to the first slot 924. The panels are arrayed in a layered fashion, one in front of the other, and a member 960 protrudes through each slot approximately in perpendicular orientation to the two parallel panels as shown in a view 940. A point 962 at which the member 960 protrudes through the panels 922 and 932 represents the movable pivot point.

Motion in a first dimension, indicated by an arrow 926, occurs when the first panel 922 is moved relative to the second panel 932, which causes the member 960 to be moved through the slot 934 in the second panel 932 in the first dimension (or direction) 926. Motion in a second dimension, indicated by an arrow 936, occurs when the second panel 932 is moved relative to the first panel 922, which causes the member 960 to be moved through the slot 924 in the first panel 922 in the second dimension (or direction) 936. The arrangement of slots shown permits the point 962 to be moved anywhere with the area of a circle indicated by 950. Variations are readily implemented that allow motion within a plane or surface by simultaneous movement of both panels.

Moving a pivot point as described above can be used to adjust a dihedral angle of a wing. Accordingly, a dihedral angle of a wing member can be adjusted independently of the dihedral angles of the other wing members or the dihedral angles of the wing members can be adjusted in unison.

Figure 10:
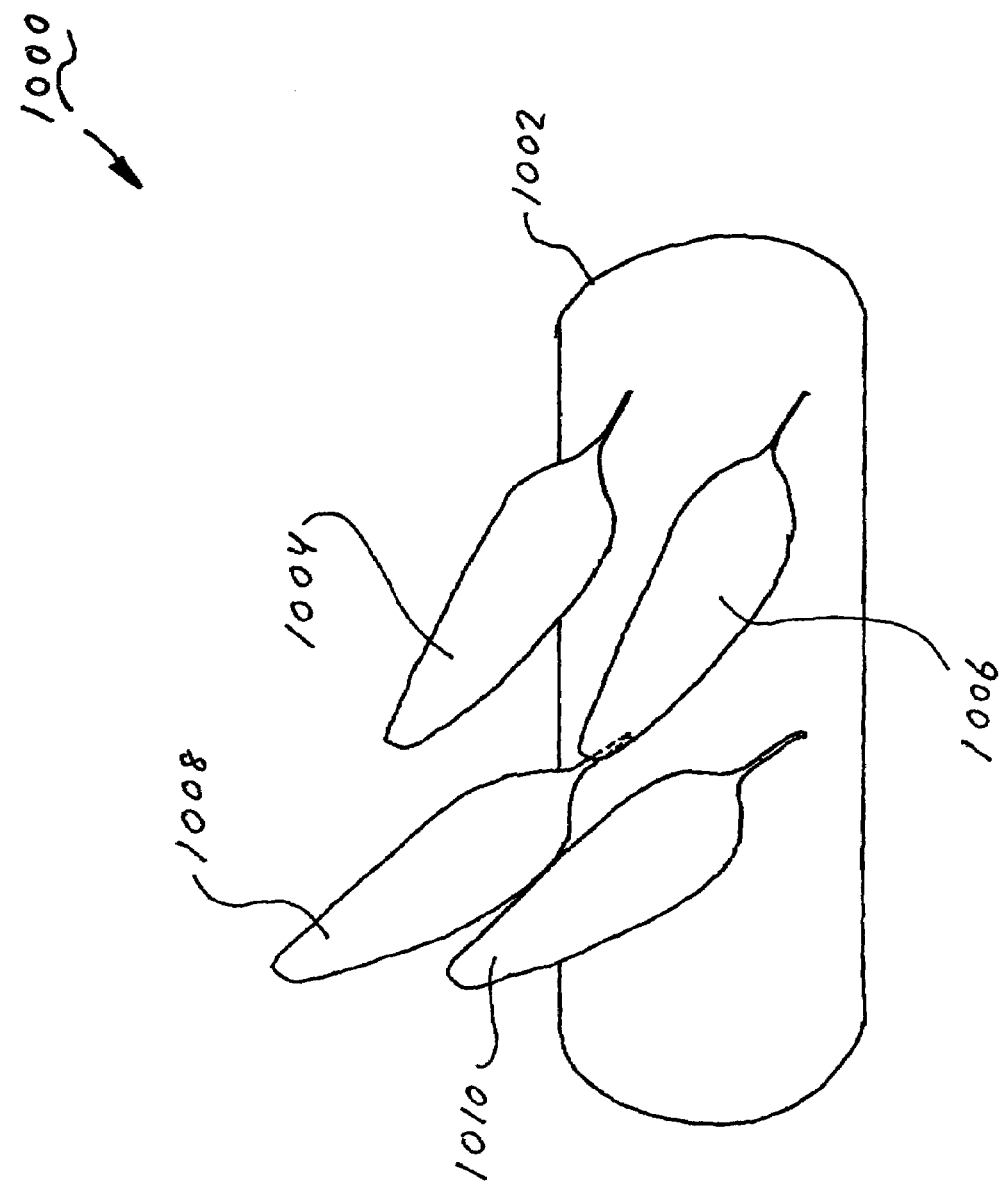
FIG. 10 illustrates an array of wing members, according to one embodiment.

FIG. 10 illustrates an array of wing members, according to one embodiment, generally at 1000. With reference to FIG. 10, a chassis 1002 has a plurality of wing drive units attached thereto. The plurality of wing drive units 1004, 1006, 1008, and 1010 is a group of four in the example shown in FIG. 10. However, any number of wing drive units can be combined in horizontal rows or vertical stacks. Wing drive units can be grouped into pairs, as described above in conjunction with FIG. 8B. Any combination of wing drive units is possible within the teaching of embodiments presented herein and no limitation is implied by the examples given. The arrangements shown in the figures are only examples of the many different configurations that are possible and those of skill in the art will recognize that many other configurations (not shown) are possible.

Figure 11:
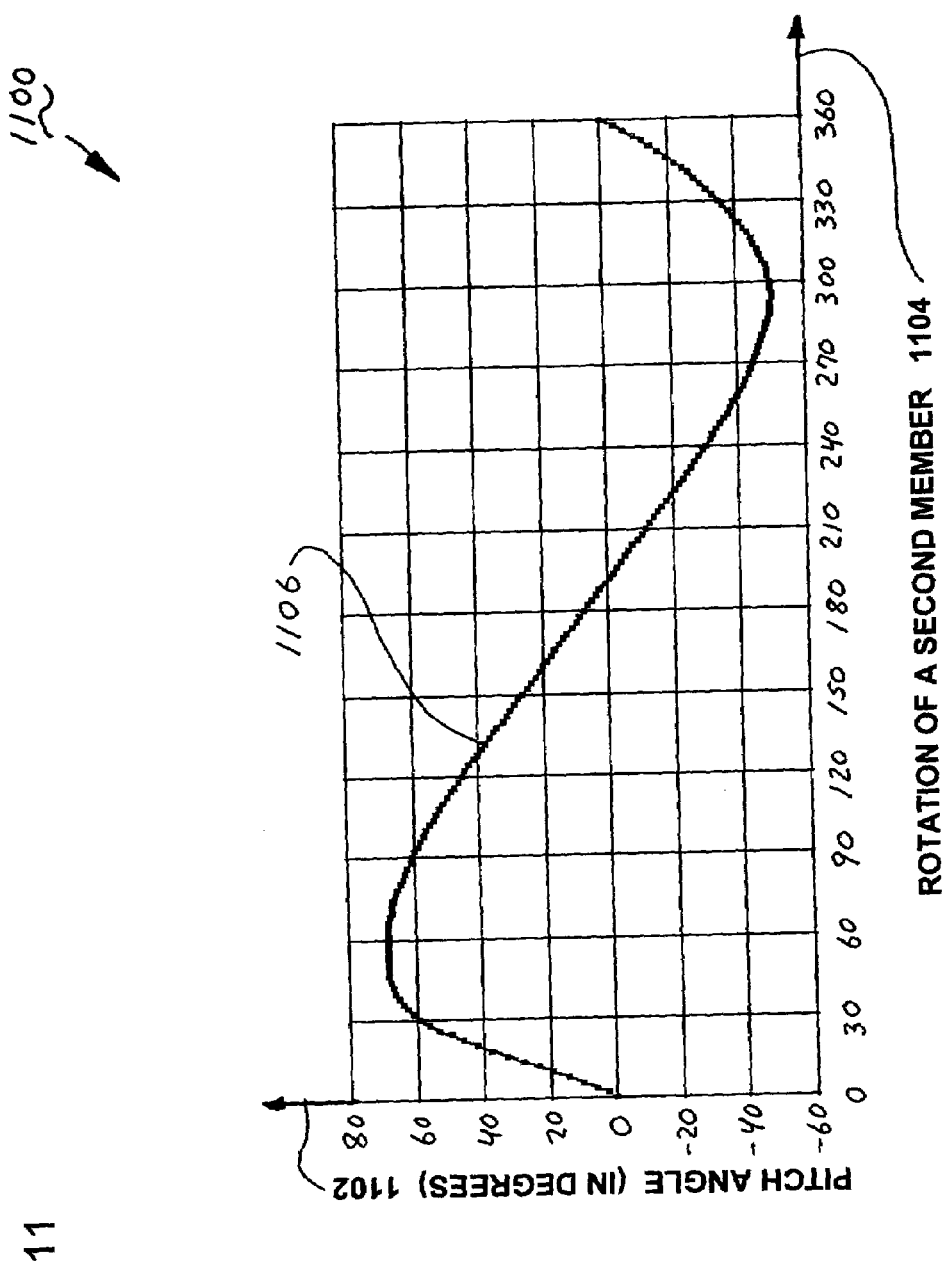
FIG. 11 illustrates a functional relationship between pitch angle of a wing member and rotation of a second member with reference to the chassis, according to one embodiment.

FIG. 11 illustrates a functional relationship between pitch angle of a wing member and rotation of a second member with reference to the chassis, according to one embodiment generally at 1100. With reference to FIG. 11, in various embodiments, a vertical axis 1102 displays a pitch angle of a member or a wing portion, such as but not limited to 118 (FIG. 1A), 341 (FIG. 3A), etc. A horizontal axis 1104 displays rotation of a second member about a second point, such as, but not limited to, 106 (FIG. 1A), 325 (FIG. 3B), etc. A variation of pitch angle with rotation of a second member (a functional relationship) is displayed at 1106.

The functional relationship 1106 is one of the many functional relationships that can be created by varying the shape and offset of rotation axes of the gears 335 and 330 (FIG. 3D). Referring back to FIG. 3D, for example, if the gears 335 and 330 are circular and are mounted for rotation on their geometrical centers, then the functional relationship 1106 (FIG. 11) would be a flat line. As an offset between the axis of rotation and the geometrical centers of the gears 335 and 330 increases, the amplitude of the oscillation in 1106 increases. It will be noted that gears 335 and 330 can be circular in shape mounted off of their geometrical centers as well as non-circular in shape. One type of non-circularly shaped gear is elliptical. In various embodiments, non-circular gears can be used for the gears 335 and 330, consistent with a condition of contact between the gears during rotation about the axes that they are mounted on. It will be noted that the gears 335 and 330 are mounted with their respective principal axis in a parallel configuration as shown in FIG. 3D. While the pitch angle is shown to fluctuate approximately within the range of ±60 degrees in the functional relationship 1106, embodiments of the present invention are not so limited. For example, a pitch angle can fluctuate within many other ranges depending on the parameters of a particular design, such as but not limited to, ±30 degrees or less, ±45 degrees, ±70 degrees, etc.

In some embodiments, it may be convenient to use an actuator to provide rotation of a wing member in order to change pitch angle. In various embodiments, an actuator can be built into or outside of an envelope of a member such as the third member 110 (FIG. 1A) or the third member 337 (FIG. 3A). The actuator can provide for rotation relative to a second member, such as 106 (FIG. 1A) or the second member 325 (FIG. 3A).

Figure 12:
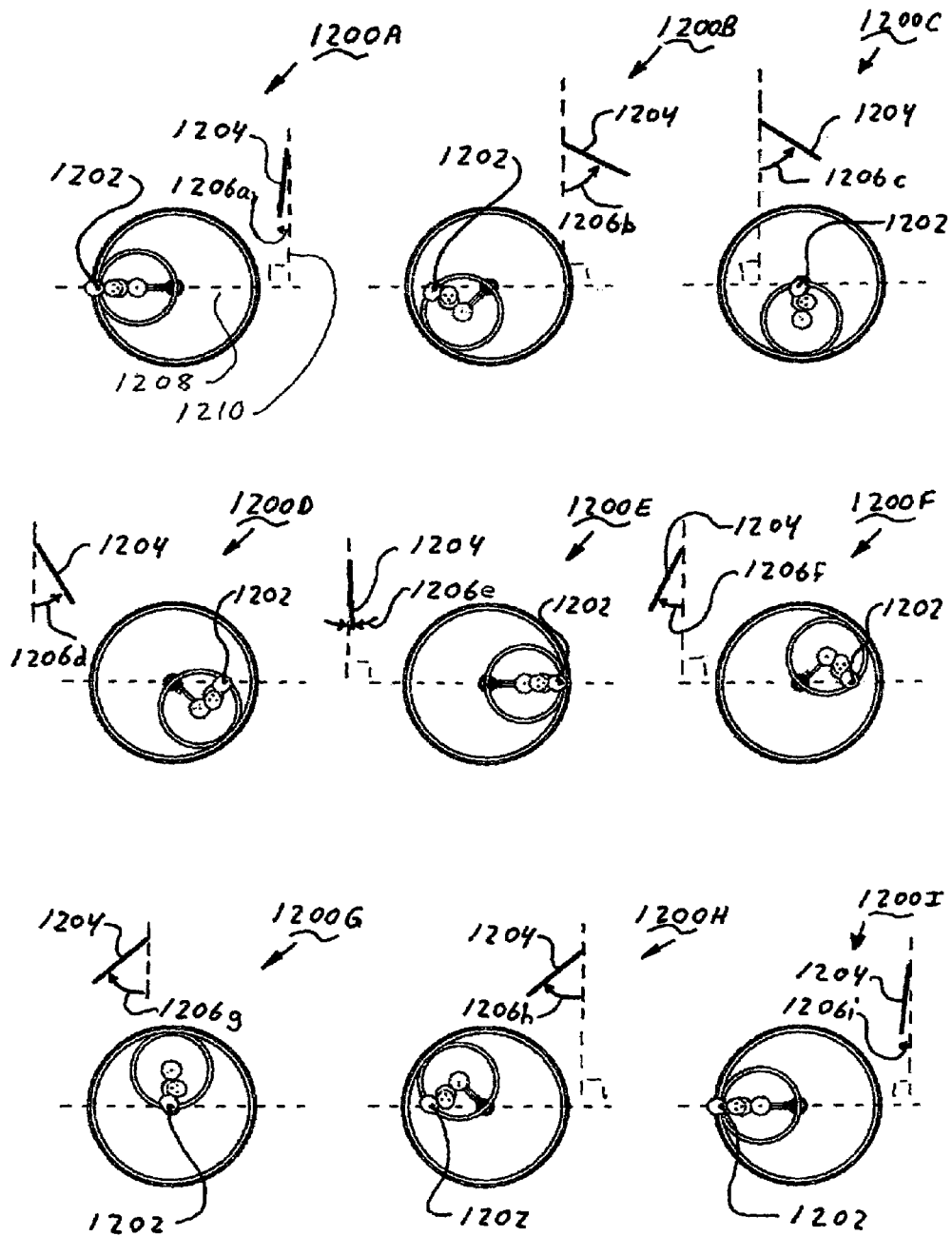
FIG. 12 illustrates a variable pitch angle of a wing member, according to another embodiment.

FIG. 12 illustrates a variable pitch angle of a wing member, according to another embodiment. With reference to FIG. 12, a variation of pitch angle of a wing member 1204 is shown for nine positions (1200A, 1200B, 1200C, 1200D, 1200E, 1200F, 1200G, 1200H, and 1200I) of the wing member 1204 during one cycle of oscillatory motion. In one embodiment, the variation of pitch angle shown in the FIG. 12 can be used for stationary flight, such as hovering.

In the nine positions shown in FIG. 12, a path 1208 of an end 1202 of a member (not shown) indicates an orientation of a stroke plane of the wing member 1204. A reference line 1210 is arbitrarily shown in perpendicular orientation to the stroke plane 1208 and in arbitrary orientation to the wing member 1204 in all of the positions 1200A, 1200B, 1200C, 1200D, 1200E, 1200F, 1200G, 1200H, and 1200I; however, 1210 and 1208 are only labeled in position 1200A for clarity of illustration. It will be noted that a wing member need not rotate about an end point, but may be configured for rotation about a point along the length of the profile of the wing member. In FIG. 12, 1204 represents a profile of a wing member; however 1204 is referred to as "a wing member" to simplify the discussion of the figure. The reference line 1210 has been arbitrarily placed relative to the wing member 1204 and should not be used to limit interpretation of the figures.

In position 1200A, the wing member 1204 is substantially at a first extreme position of its stroke (furthest right). The wing member 1204 makes an angle 1206a with the reference 1210. As the wing member 1204 moves to the left, as shown in position 1200B, the wing member 1204 rotates counter-clockwise to a position as indicated by an angle 1206b. In position 1200C, the wing member 1204 continues moving to the left, at an angle indicated at 1206c. In position 1200D, the wing member 1204 continues moving to the left, at an angle indicated at 1206d.

In position 1200E the wing member 1204 is at a second extreme position of its stroke (furthest left). The wing member 1204 makes an angle 1206e with the reference 1210 in position 1200E and the wing member 1204 rotates quickly in a clockwise direction as the wing member begins the second half of its oscillatory cycle. In position 1200F, the wing member 1204 is traveling to the right and the wing member 1204 makes an angle as indicated at 1206f with the reference. In position 1200G the wing member 1204 continues traveling to the right and the wing member 1204 makes an angle as indicated at 1206g with the reference. In position 1200H the wing member 1204 continues traveling to the right and the wing member 1204 makes an angle as indicated at 1206h with the reference. Position 1200I is substantially the same position as position 1200A, which places the wing member 1204 back to the first extreme position of its stroke and the oscillatory motion begins a second cycle.

During the oscillatory motion as described above in conjunction with FIG. 12, the wing member 1204 moves in oscillatory motion at large pitch angles (approximately ±50 (fifty) degrees). Variation of the pitch angle during the oscillatory motion permits the wing member 1204 to maintain a positive angle of attack with respect to the flow in both halves of the oscillatory motion cycle. The fluid flow relative to the trajectory of the wing member 1204 departs from the classical steady state aerodynamic case. The trajectory of the wing member 1204 interacts with the fluid to form circulation due to rotation of the wing member about its axis during the variation of pitch angle. Additionally, as the wing member 1204 translates from right to left or from left to right, vortices shed from the edges of the wing member 1204. A first vortex sheds from a first edge (top edge) rotating in a first direction and a second vortex sheds from a second edge (bottom edge) counter-rotating in a second direction. The pair of counter-rotating vortices produces a flow of fluid in the direction of the moving wing member 1204. For example, the flow of fluid will be to the left in position 1200D/1200E. As the wing member 1204 reverses direction and travels to the right in positions 1200F/1200G, the wing member 1204 interacts with the flow of fluid produced by the pair of counter-rotating vortices; thereby, the wing member experiences enhanced lift acting on the wing member and the chassis, with which the wing member is connected. A similar interaction occurs when the wing member is traveling in the opposite direction during the other half cycle of its oscillatory motion.

Figure 13A:
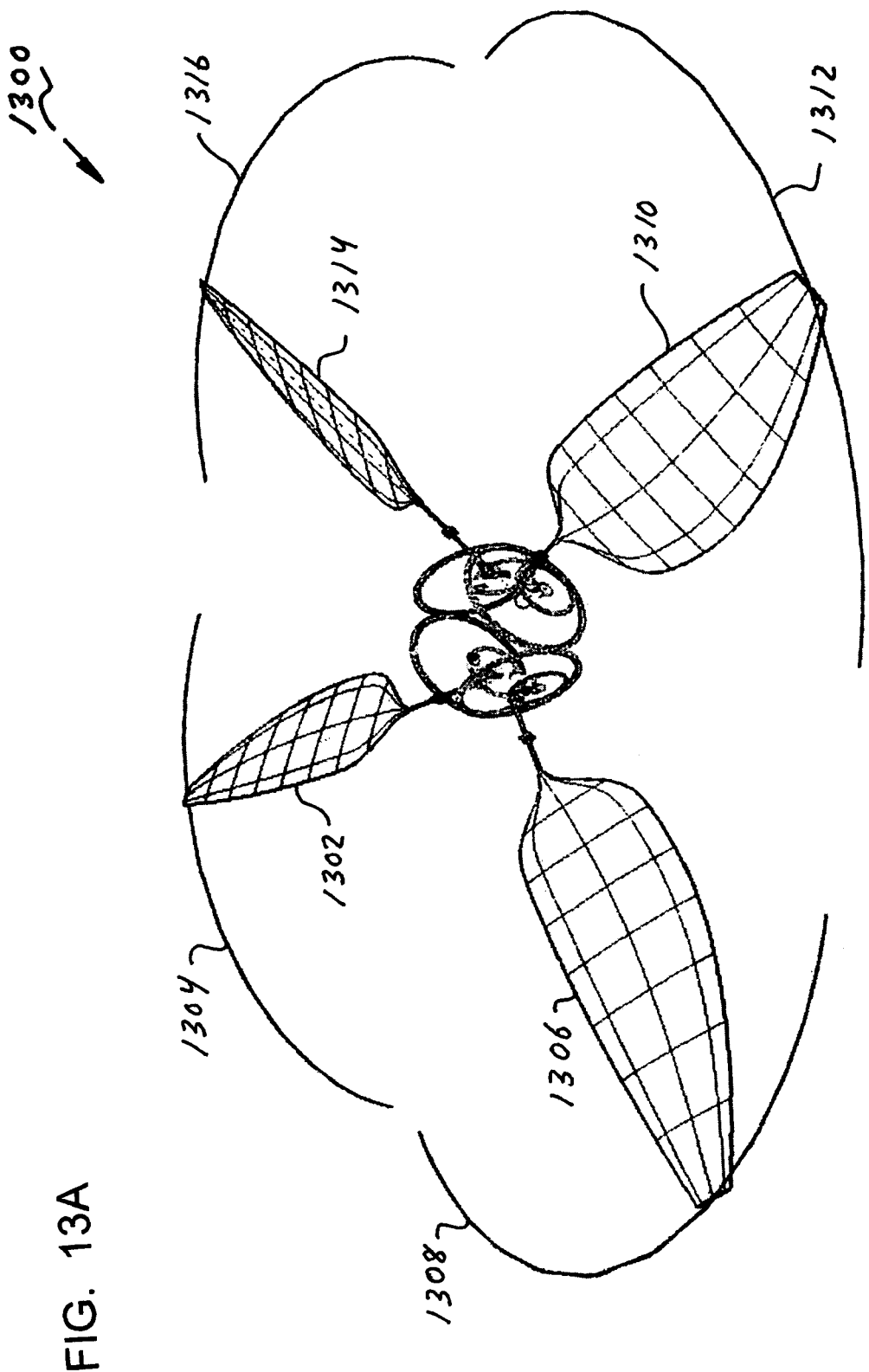
FIG. 13A illustrates wing tip trajectories during hovering, according to one embodiment.

FIG. 13A illustrates wing tip trajectories during hovering, according to one embodiment, generally at 1300. With reference to FIG. 13A, the previously described motions of the wing member 1204 (FIG. 12) are applicable to the four wing configuration illustrated in FIG. 13A. A first wing member 1302 is configured to oscillate in a stroke plane that has an outer boundary indicated by a wing tip path 1304. A second wing member 1306 oscillates in a stroke plane that has an outer boundary indicated by a wing tip path 1308. A third wing member 1310 oscillates in a stroke plane that has an outer boundary indicated by a wing tip path 1312. A fourth wing member 1314 oscillates in a stroke plane that has an outer boundary indicated by a wing tip path 1316. The motion and pitch angle of adjacent wing members is substantially 180 (one hundred eighty) degrees out of phase. In various embodiments, the wing members 1302, 1306, 1310, and 1314 can be powered from one power source or the wing members can be individually powered or a group of wing members can be powered from a common power source.

Figure 13B:
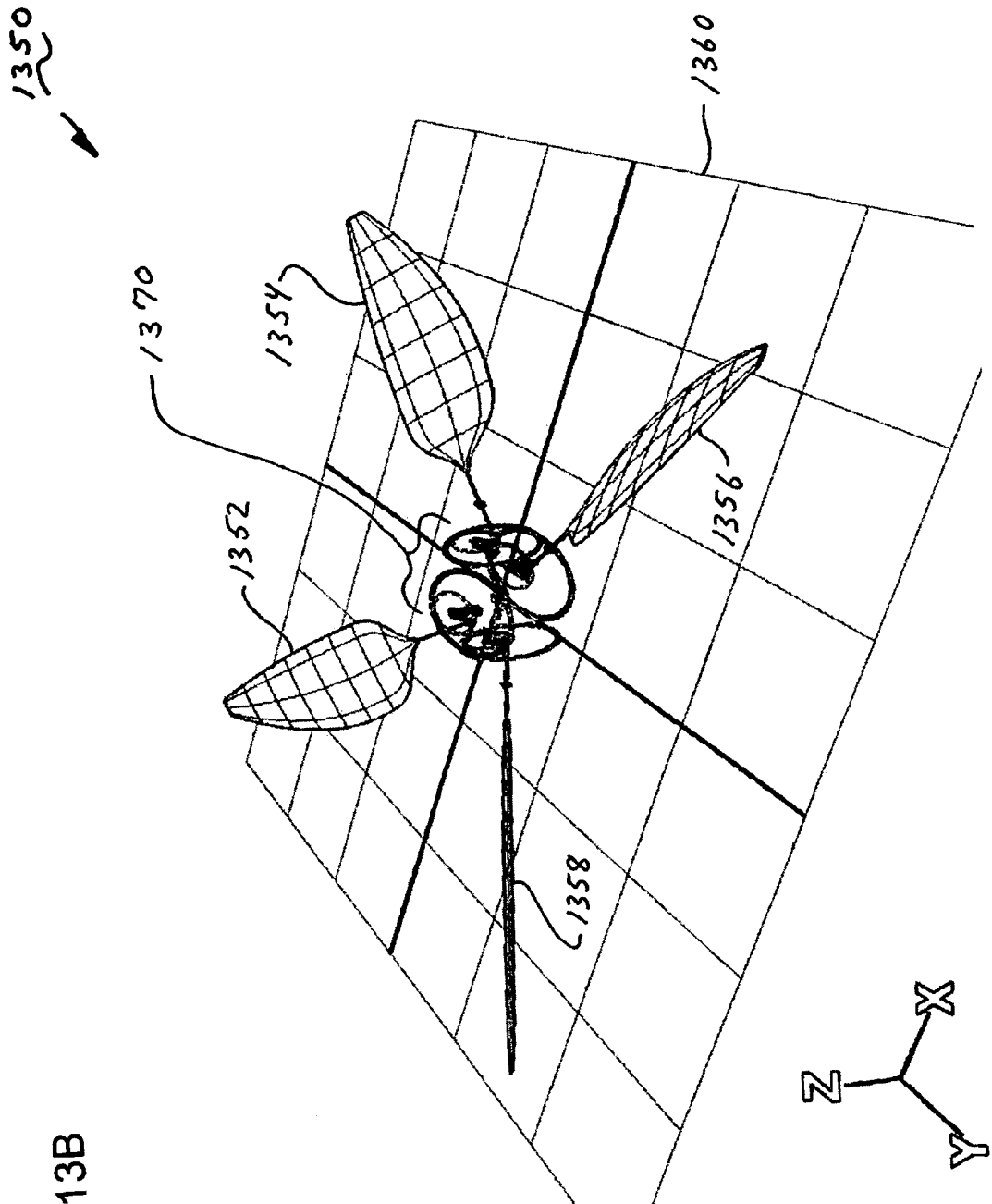
FIG. 13B illustrates hovering, according to one embodiment.

FIG. 13B illustrates hovering, according to one embodiment, generally at 1350. A chassis 1370 has four wing members: 1352, 1354, 1356, and 1358 attached thereto and configured for oscillatory motion where a pitch angle and motion of adjacent wing members are substantially one hundred and eighty degrees out of phase. It will be noted by those of skill in the art that variations in pitch angle and/or stroke plane angle can be necessary to maintain a stable hovering relationship between the chassis 1370 and a ground reference plane 1360. In one or more embodiments, variations in pitch angle of any one or more of wing members 1352, 1354, 1356, or 1358 can be accomplished by instantaneous adjustment of the first axle 303 (FIG. 3C) relative to the chassis 360 (FIG. 3C). In one or more embodiments, variations in a stroke plane of any one or more of wing members 1352, 1354, 1356, or 1358 can be accomplished by instantaneous adjustment of the first tube 302 (FIG. 3C) relative to the chassis 350 (FIG. 3C).

Figure 13C:
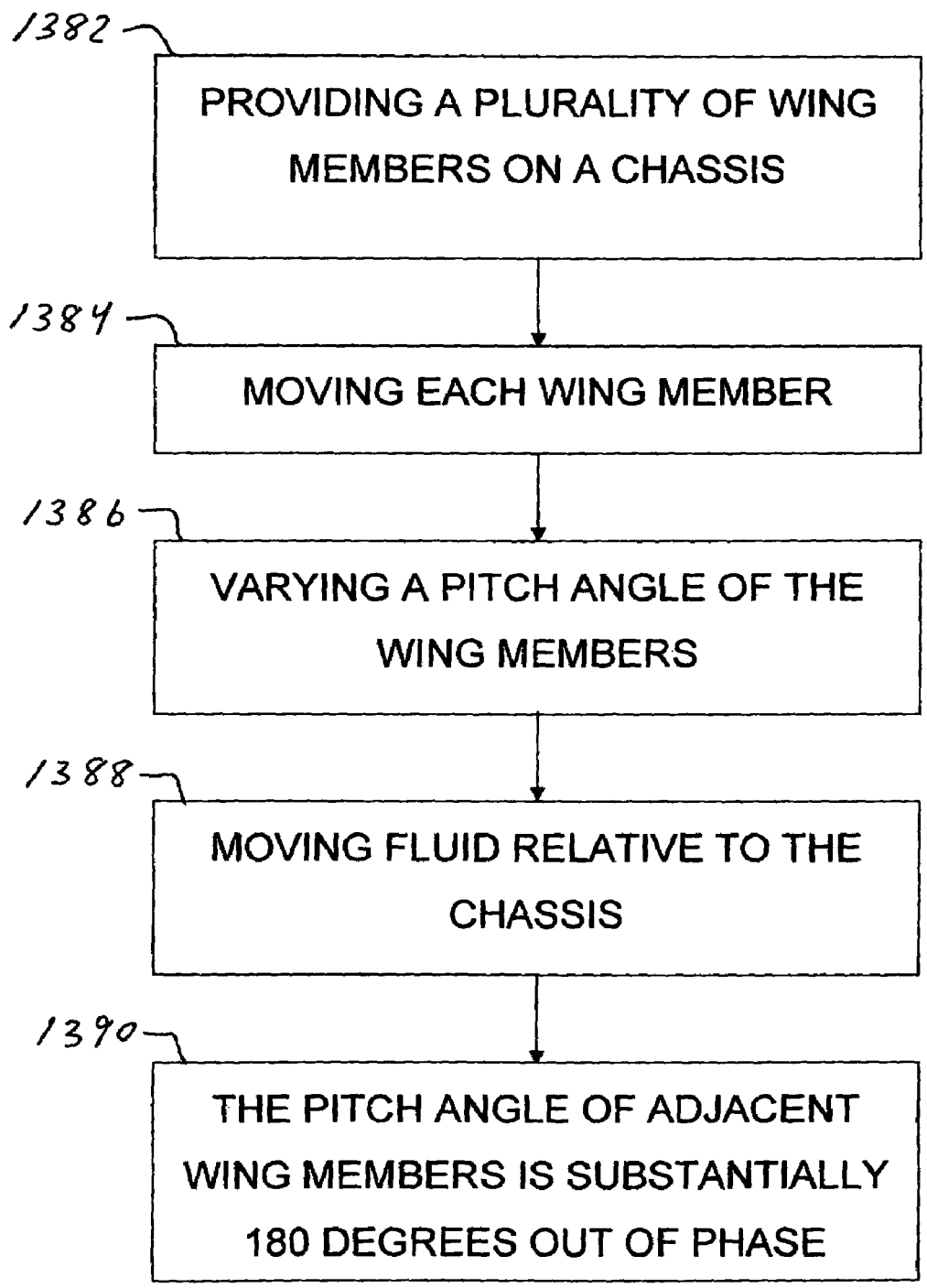
FIG. 13C illustrates a process for flight, according to another embodiment.

FIG. 13C illustrates a process for flight according to another embodiment. With reference to FIG. 13C, at block 1382 a plurality of wing members is provided on a chassis. In various embodiments, the wing members can be arranged in wing pairs (or groups) or simply distributed on the chassis. At block 1384 each wing member is moved in oscillatory motion within a stroke plane. At block 1386 a pitch angle of a wing member is varied. At block 1388 fluid is moved relative to the chassis by the wing members. At block 1390 the pitch angle of adjacent wing members is substantially 180 (one hundred eighty) degrees out of phase.

It will be noted that there can be any number of wing members attached to a chassis. The pitch angles and/or stoke planes of each wing member can be varied to provide for the desired flight characteristic of the chassis. For example, currents in the fluid that the chassis/wing members are immersed in may require instantaneous variation of one or more wing member parameters (pitch angle, stroke plane) to compensate for drift relative to a ground reference plane, such as the ground reference plane 1360 (FIG. 13B).

Figure 14:
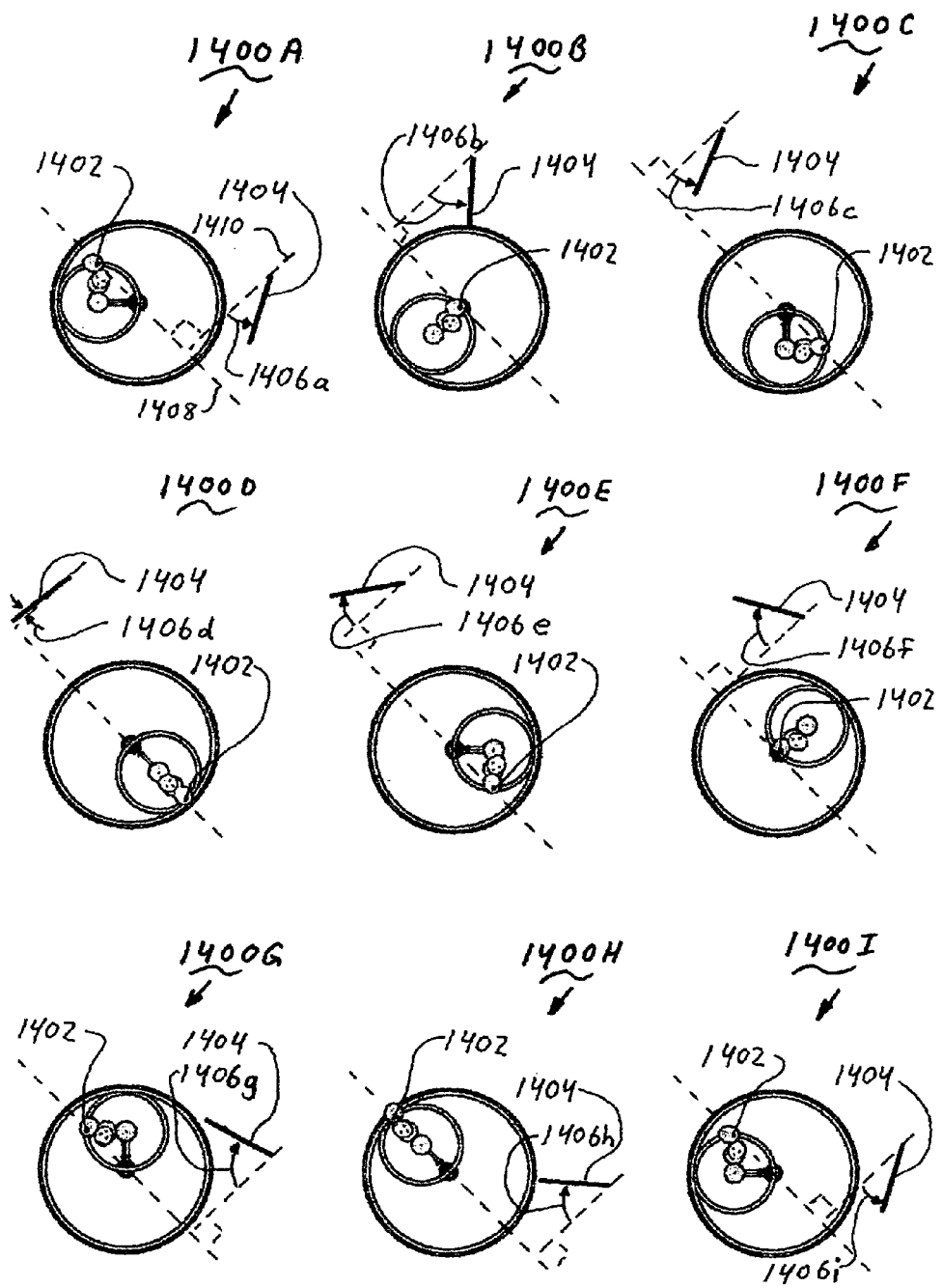
FIG. 14 illustrates a variable pitch angle of a wing member, with an inclined stroke plane, according to another embodiment.

FIG. 14 illustrates a variable pitch angle of a wing member with an inclined stroke plane, according to another embodiment. With reference to FIG. 14, a variation of pitch angle of a wing member 1404 is shown for nine positions (1400A, 1400B, 1400C, 1400D, 1400E, 1400F, 1400G, 1400H, and 1400I) of the wing member 1404 during one cycle of oscillatory motion. In one embodiment, the variation of pitch angle shown in the FIG. 14 can be used for translational motion of a chassis and associated wing members.

In the nine positions shown in FIG. 14, a path 1408 of an end 1402 of a member (not shown) indicates an orientation of a stroke plane of the wing member 1404. A reference line 1410 is arbitrarily shown in perpendicular orientation to the stroke plane 1408 and in arbitrary orientation to the wing member 1404 in all of the positions 1400A, 1400B, 1400C, 1400D, 1400E, 1400F, 1400G, 1400H, and 1400I; however, 1410 and 1408 are only labeled in position 1400A for clarity of illustration. It will be noted that a wing member need not rotate about an end point, but may be configured for rotation about a point along the length of the profile of the wing member (1404 represents a profile of a wing member; however 1404 is referred to as "a wing member" to simplify the discussion of the figure). The reference line 1410 has been arbitrarily placed relative to the wing member 1404 and should not be used to limit interpretation of the figures.

In position 1400A, the wing member 1404 has passed through a first extreme position of its stroke (furthest right) and is moving in an upper left direction. The wing member 1404 makes an angle 1406*a* with the reference 1410 in position 1400A. In position 1400B, the wing member 1404 continues moving to the left, at an angle indicated at 1406*b*. As the wing member 1404 moves to the left, as shown in position 1400C, the wing member 1404 rotates clockwise to a position as indicated by an angle 1406*c*. In position 1400D, the wing member 1404 is substantially at an extreme position of its stroke (farthest left position), at an angle indicated at 1406*d*.

In position 1400E, the wing member 1404 moves to the right, at an angle indicated at 1406*e*. The wing member 1404 makes an angle 1406*e* with the reference in position 1400E and the wing member 1404 rotates quickly in a clockwise direction as the wing member begins the second half of its oscillatory cycle. In position 1400F, the wing member 1404 is traveling to the right and the wing member 1404 makes an angle as indicated at 1406*f* with the reference. In position 1400G the wing member 1404 continues traveling to the right and the wing member 1404 makes an angle as indicated at 1406*g* with the reference. In position 1400H the wing member 1404 is at a second extreme position of its stroke (furthest right position). Position 1400I is substantially the same position as position 1400A which starts the wing member 1404 traveling back in the left direction and the oscillatory motion begins a second cycle.

During the oscillatory motion as described above in conjunction with FIG. 14, the wing member 1404 moves in oscillatory motion at large pitch angles (approximately 60 degrees). Variation of the pitch angle during the oscillatory motion permits the wing member 1404 to maintain a positive angle of attack with respect to the flow in both cycles of the oscillatory motion.

Figure 15A:
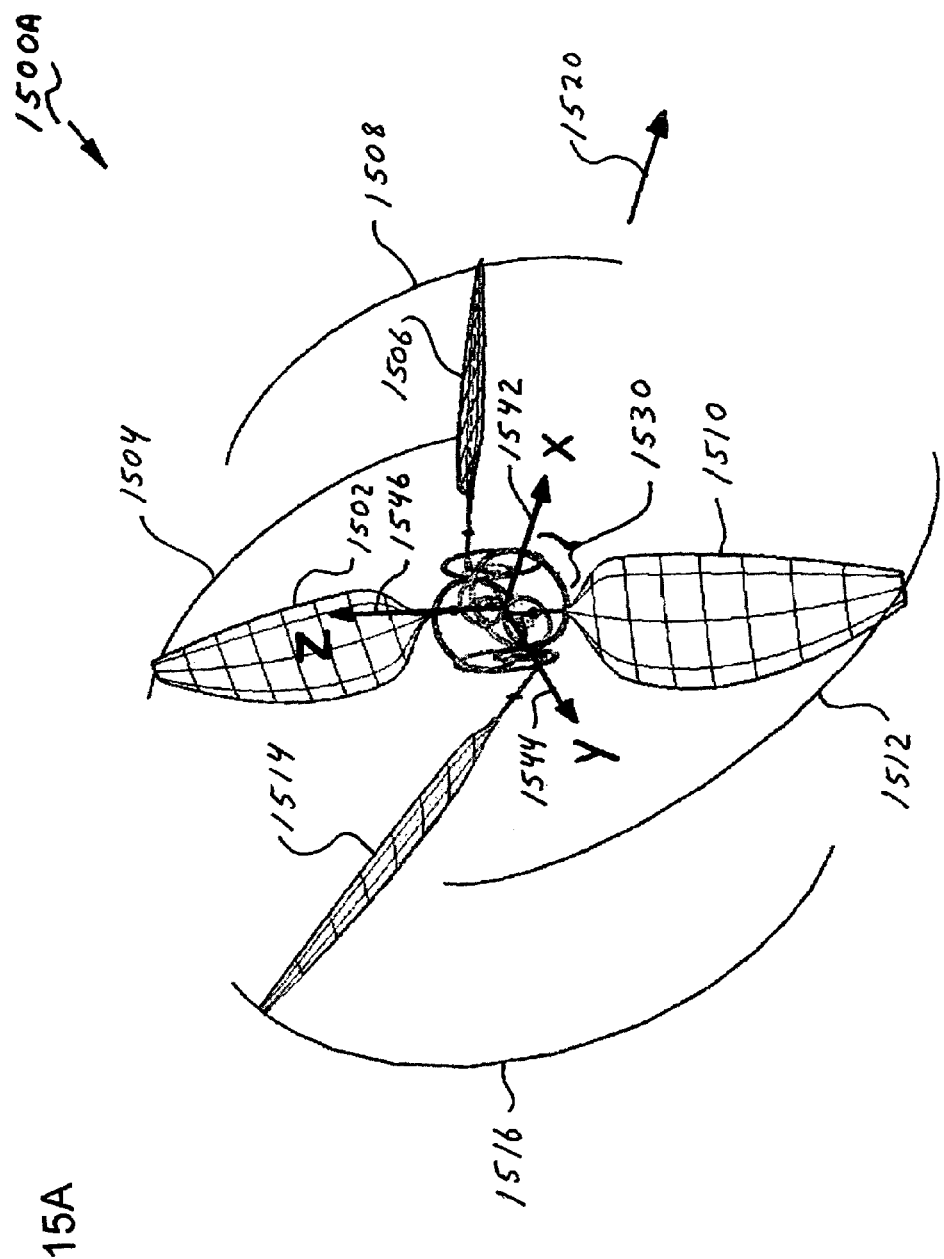
FIG. 15A depicts wing tip trajectories during forward flight, according to one embodiment.

FIG. 15A depicts wing tip trajectories during forward flight, according to one embodiment, generally at 1500A. With reference to FIG. 15A, the previously described motions of the wing member 1404 (FIG. 14) are applicable to the four wing configuration illustrated in FIG. 15A. A first wing member 1502 is configured to oscillate in a stroke plane that has an outer boundary indicated by a wing tip path 1504. A second wing member 1506 oscillates in a stroke plane that has an outer boundary indicated by a wing tip path 1508. A third wing member 1510 oscillates in a stroke plane that has an outer boundary indicated by a wing tip path 1512. A fourth wing member 1514 oscillates in a stroke plane that has an outer boundary indicated by a wing tip path 1516.

The wing member 1502 and the wing member 1506 form a first wing pair or group and the wing member 1510 and the wing member 1514 form a second wing pair or group. Motion between the wing member 1502 and the wing member 1506 is out of phase. In one embodiment, the motion of the wing member 1506 leads the motion of the wing member 1502 by a phase angle. In various flight configurations, the phase angle ranges up to 180 (one hundred eighty) degrees. Similarly, motion between the wing member 1510 and the wing member 1514 is out of phase. In one embodiment, the motion of the wing member 1510 leads the motion of the wing member 1514 by a phase angle. In various flight configurations, the phase angle ranges up to 180 (one hundred eighty) degrees.

For flight in a substantially straight line as indicated by an arrow 1520, the motion of the wing pairs should be substantially mirrored. For example, the motion of wing member 1506 and 1510 is substantially in phase and the motion of wing member 1502 and the wing member 1514 is substantially in phase.

It will be understood by those of skill in the art, that as used in this description of embodiments, terms such as, "mirrored," "substantially in phase," "in phase," "out of phase," etc. are used to describe relative differences between a motion of a wing member in a first wing group (synonymous with wing pair) and a motion of a wing member in a second wing group (where the first wing group and the second wing group point in substantially opposite directions relative to a chassis on which they are attached). In the example of FIG. 15A, the motion of a chassis 1530 is represented by the arrow 1520. The arrow 1520 is parallel to an axis 1542 (X axis) of a local coordinate system centered on the chassis 1530. The local coordinate system includes the X axis at 1542, a Y axis at 1544, and a Z axis at 1546. When the motion of two opposing wing members, such as the wing member 1506 and the wing member 1510 is viewed, as in the example of FIG. 15A, in the YZ plane of the local coordinate system, their motion is mirrored about the Z axis 1546. When the motion of two opposing wing members, such as the wing member 1506 and the wing member 1510 is viewed, as in the example of FIG. 15A, in the XZ plane of the local coordinate system, the motion is said to be "substantially in phase," or "in phase." Thus, the motion of wing members 1506 and 1510 can be equivalently described as mirrored (with reference to the YZ plane of the local coordinate system) or with reference to the XZ plane of the local coordinate system, "substantially in phase," "in phase," etc.

In the case of wing members within a wing group, located on a particular side of a chassis, such as in the example of FIG. 15A, either a first wing group, which includes wing members 1502 and 1506 or a second wing group, which includes wing members 1514 and 1510, terms using the word "phase" such as, "substantially in phase, "in phase," "out of phase," etc. are used at times to describe the motion between wing members within the wing group. As described above, during the forward flight in the example of FIG. 15A, the motion of wing member 1510 is out of phase with motion of wing member 1514 and the motion of wing member 1506 is out of phase with the motion of wing member 1502.

Therefore, those of skill in the art will understand that terms such as "mirrored," "substantially in phase," "in phase," "out of phase," etc. can be used to describe motions of different wing members or wing groups as referred to an appropriate reference plane of a local coordinate system associated with a vehicle during various forms of flight. In the example of FIG. 15A the vehicle is represented by the chassis 1530 and the wing members 1502, 1506, 1510, and 1514. In the figures that follow, such descriptive terms, "mirrored," substantially in phase," "in phase," "out of phase," etc. describe motions of different wing members, wing groups, etc. without explicitly illustrating a local coordinate system associated with a vehicle. It will be understood, however, that an appropriate local coordinate system is implied by the use of such terms as described above.

A wing pair or "group" can include more than two wing members; for example, a wing group can include a plurality of wing members. In such a configuration, the wing members within a wing group will have a phase angle between adjacent members. In an example with three wing members per group, a constant phase angle of $\alpha$ "alpha" degrees can exist between adjacent wing members within a wing group. In one example, $\alpha$ "alpha" equals 45 (forty-five) degrees. A 45 (forty-five) degree phase angle between wing members will place the motion of the second wing member 45 (forty-five) degrees behind the motion of the forward or first wing member. The motion of the third or last wing member will lag the motion of the first wing member by 90 (ninety) degrees and the third or last wing member will lag the motion of the second wing member by 45 (forty-five) degrees.

In other examples, a non-constant phase angle offset exists between the motion of wing members. In the case of three wing members per wing group, the second wing member's motion can lag the first wing member's motion by an angle of $\psi$ "psi" degrees and the third wing member's motion can lag the second wing member's motion by an angle of $\theta$ "theta" degrees, where $\psi$ "psi" does not equal $\theta$ "theta."

Figure 15B:
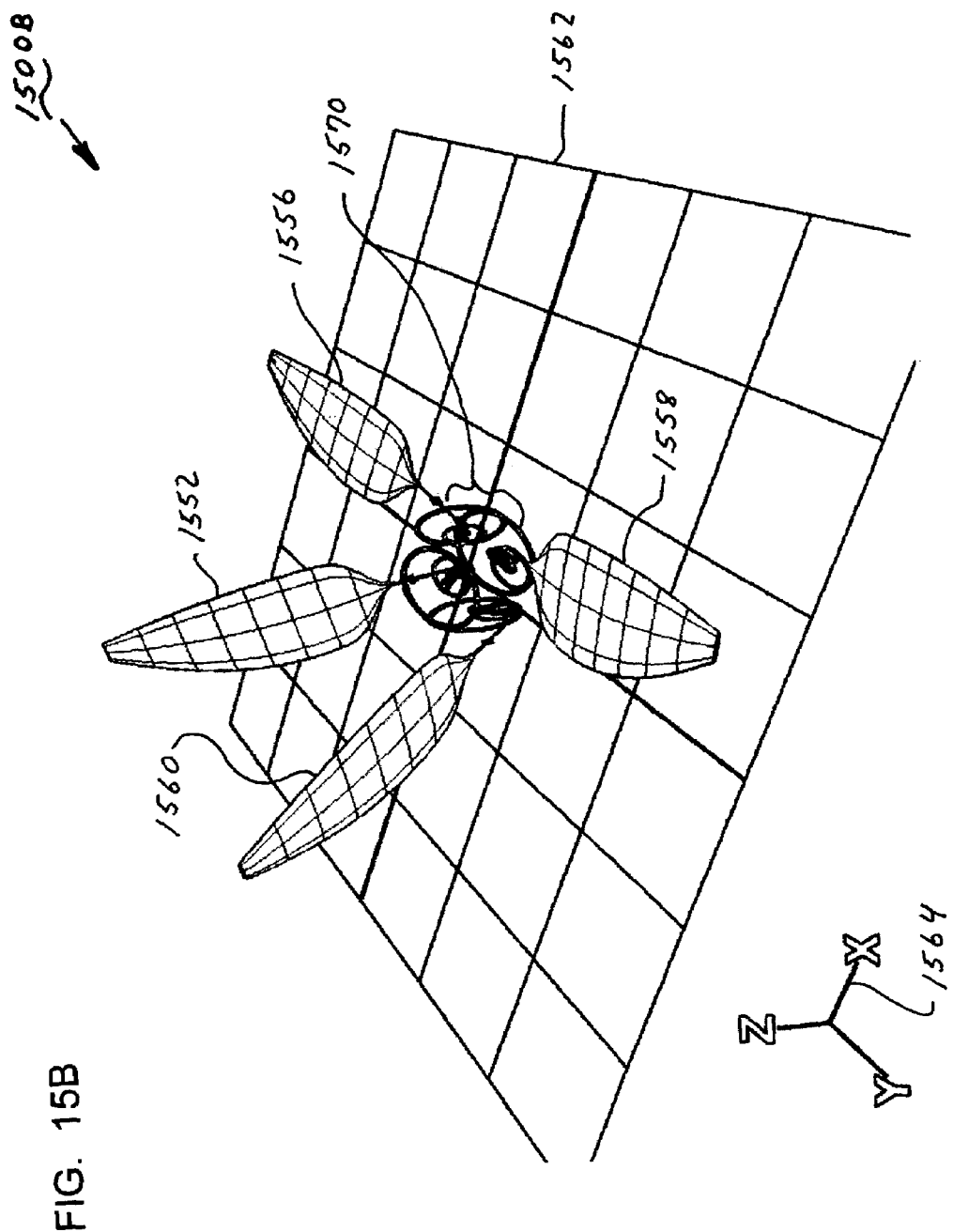
FIG. 15B illustrates forward flight, according to another embodiment.

FIG. 15B illustrates forward flight according to another embodiment, generally at 1500B. A chassis 1570 has four wing members: 1552, 1556, 1558, and 1560 attached thereto and configured for oscillatory motion in two wing groups as described above in is conjunction with FIG. 15A, wherein the wing member 1552 and the wing member 1556 form a first wing group and the wing member 1558 and the wing member 1560 form a second wing group with a phase angle existing between the motion of the wing members within a wing group. The motion of the wing groups is substantially mirrored.

Figure 15C:
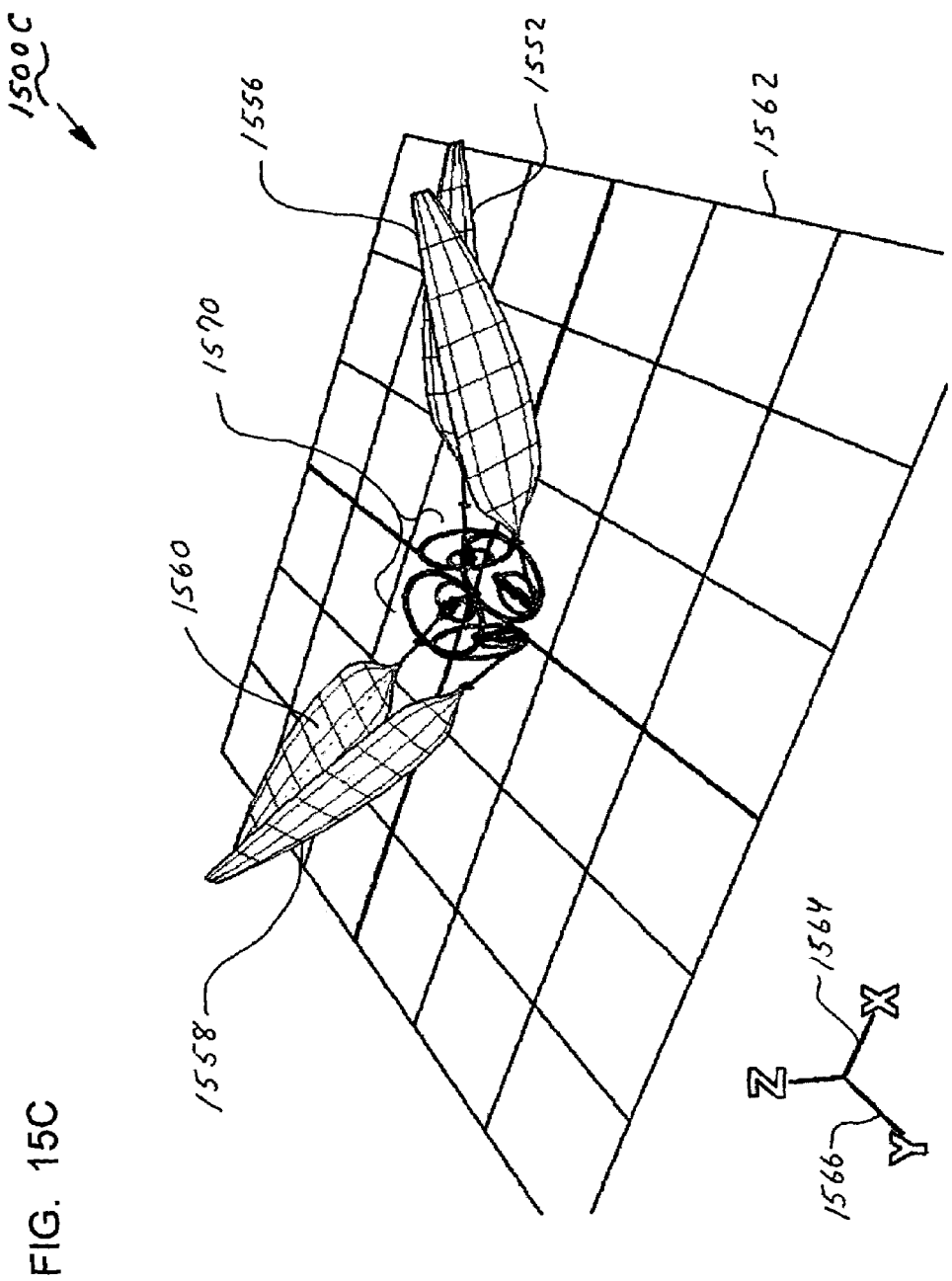
FIG. 15C illustrates translation in the positive Y direction, according to one embodiment.

FIG. 15C illustrates translation in the positive Y direction, according to one embodiment, generally at 1500C. With reference to FIG. 15C, the positions indicated by the wing members 1552, 1556, 1558, and 1560 illustrate another snapshot of the continuous motion exhibited by the wing members as the chassis 1570 translates along the positive Y direction at 1566.

Figure 15D:
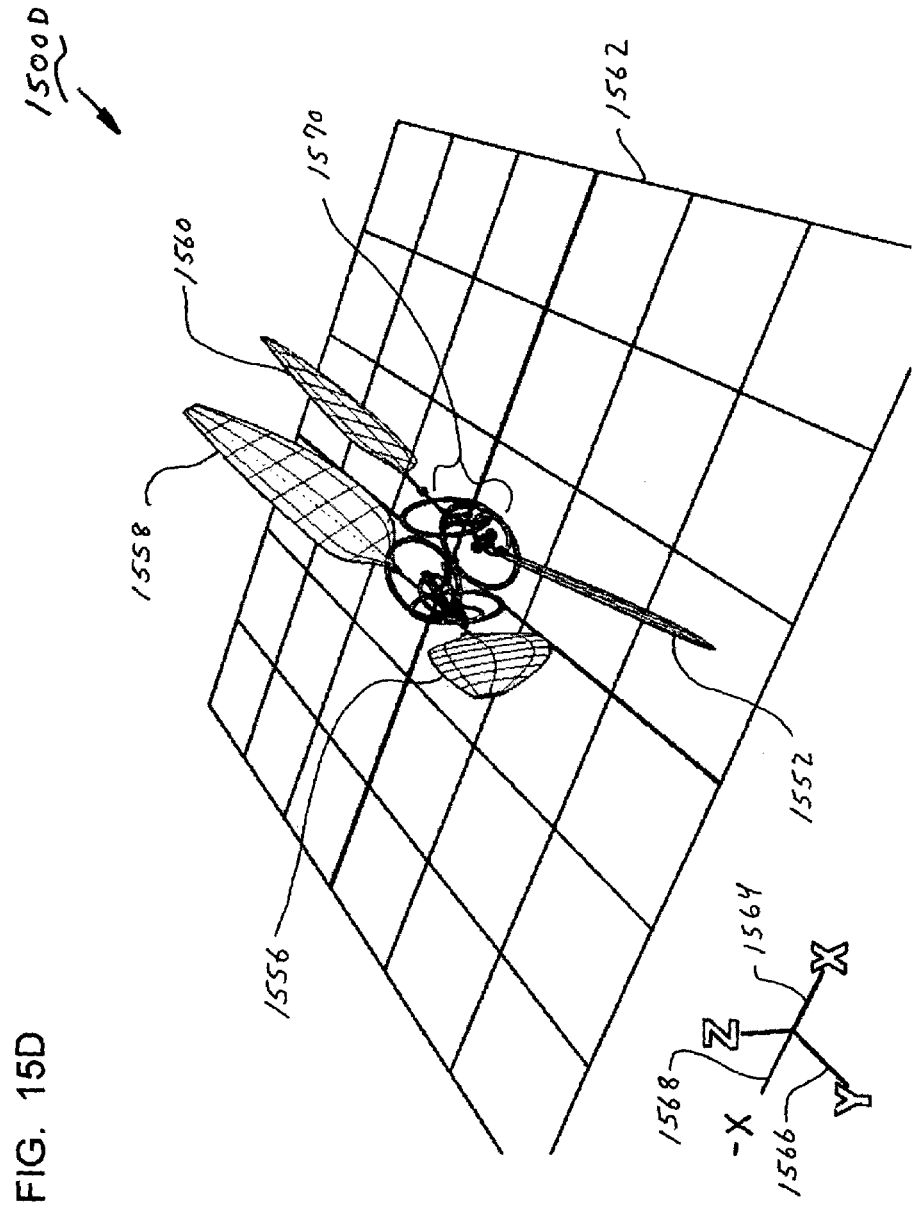
FIG. 15D illustrates translation in the negative X direction, according to one embodiment.

FIG. 15D illustrates translation in the negative X direction, according to one embodiment, generally at 1500D. With reference to FIG. 15D, the positions indicated by the wing members 1552, 1556, 1558, and 1560 illustrate another snapshot of the continuous motion exhibited by the wing members as the chassis 1570 translates along the negative X direction at 1568.

In one embodiment, the views provided at FIG. 15B, FIG. 15C, and FIG. 15D can represent a one hundred and eighty degree turn that the chassis 1570 executes from translation in the positive X direction at 1564 (FIG. 15B) to translation in the negative X direction FIG. 15D at 1568. Such a turn (clockwise around the Z axis) can be accomplished by increasing the forward force imparted to the chassis by the wing members 1552 and 1556 relative to the forward force imparted to the chassis by the wing members 1560 and 1558 in a variety of ways. A first way increases the flap rate of the wing members 1552 and 1556 relative to the wing members 1558 and 1560. A second way increases the relative pitch angle of the wing members 1552 and 1556 relative to the wing members 1558 and 1560. A third way alters the wing members 1558 and 1560 to move in more of a hover motion relative to the motion of the wing members 1552 and 1556.

It will be noted by those of skill in the art that variations in pitch angle and/or stroke plane angle might be necessary to maintain a stable flight path between the chassis 1570 and a ground reference plane 1562. In one or more embodiments, variations in pitch angle of any one or more of wing members 1552, 1556, 1558, or 1560 can be accomplished by instantaneous adjustment of the first axle 303 (FIG. 3C) relative to the chassis 360 (FIG. 3C). In one or more embodiments, variations in a stroke plane of any one or more of wing members 1552, 1556, 1558, or 1560 can be accomplished by instantaneous adjustment of the first tube 302 (FIG. 3C) relative to the chassis 350 (FIG. 3C).

In one embodiment, the wing members, 1552, 1556, 1558, and 1560 oscillate in stroke planes that are configured at one angle relative to a horizontal plane of the chassis 1570. In some embodiments the angel is positive and in other embodiments the angel is negative.

Figure 15E:
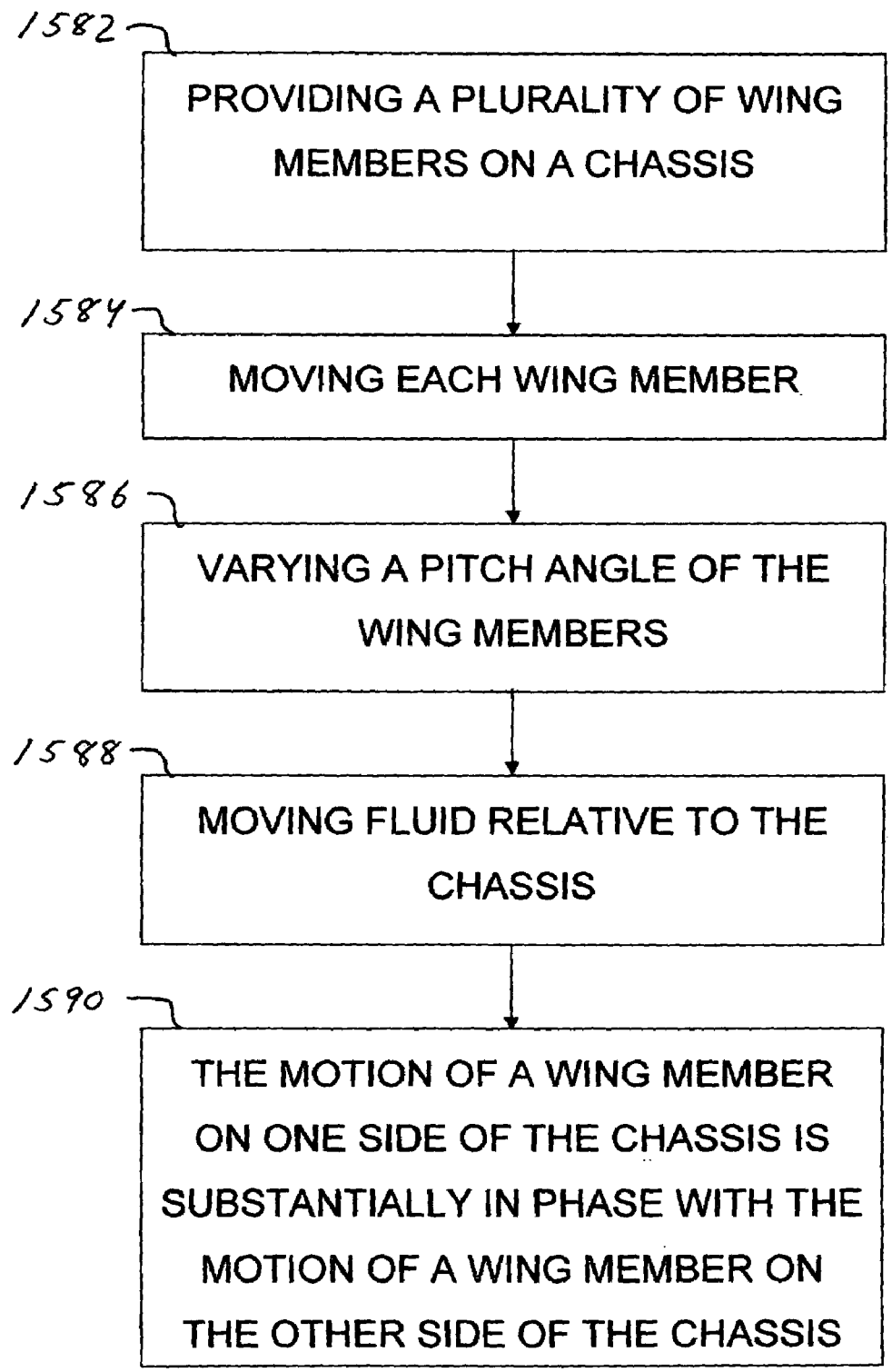
FIG. 15E illustrates a process for flight, according to yet another embodiment.

FIG. 15E illustrates a process for flight according to yet another embodiment. With reference to FIG. 15E, at block 1582 a plurality of wing members is provided on a chassis. In various embodiments, the wing members can be arranged in wing pairs or groups or simply distributed on the chassis. At block 1584, each wing member is moved in oscillatory motion within a stroke plane. At block 1586, a pitch angle of a wing member is varied. At block 1588 fluid is moved relative to the chassis by the wing members. At block 1590 the motion of a wing member on a first side of a chassis is substantially in phase with the motion of a corresponding wing member on a second side of a chassis.

In various embodiments, the process of FIG. 15E produces translational flight with the stroke planes of wing members configured at an angle relative to a horizontal plane of a chassis. In some embodiments, the angle is positive and in some embodiments the angle is negative.

It will be noted that there can be any number of wing members attached to a chassis. The pitch angles and/or stoke planes of each wing member can be varied to provide the desired flight characteristics of the chassis. For example, currents in the fluid that the chassis/wing members are immersed in may require instantaneous variation of one or more wing member parameters (pitch angle, stroke plane) to compensate for drift relative to a ground reference plane, such as the ground reference plane 1562 (FIG. 15B-D).

Figure 16:
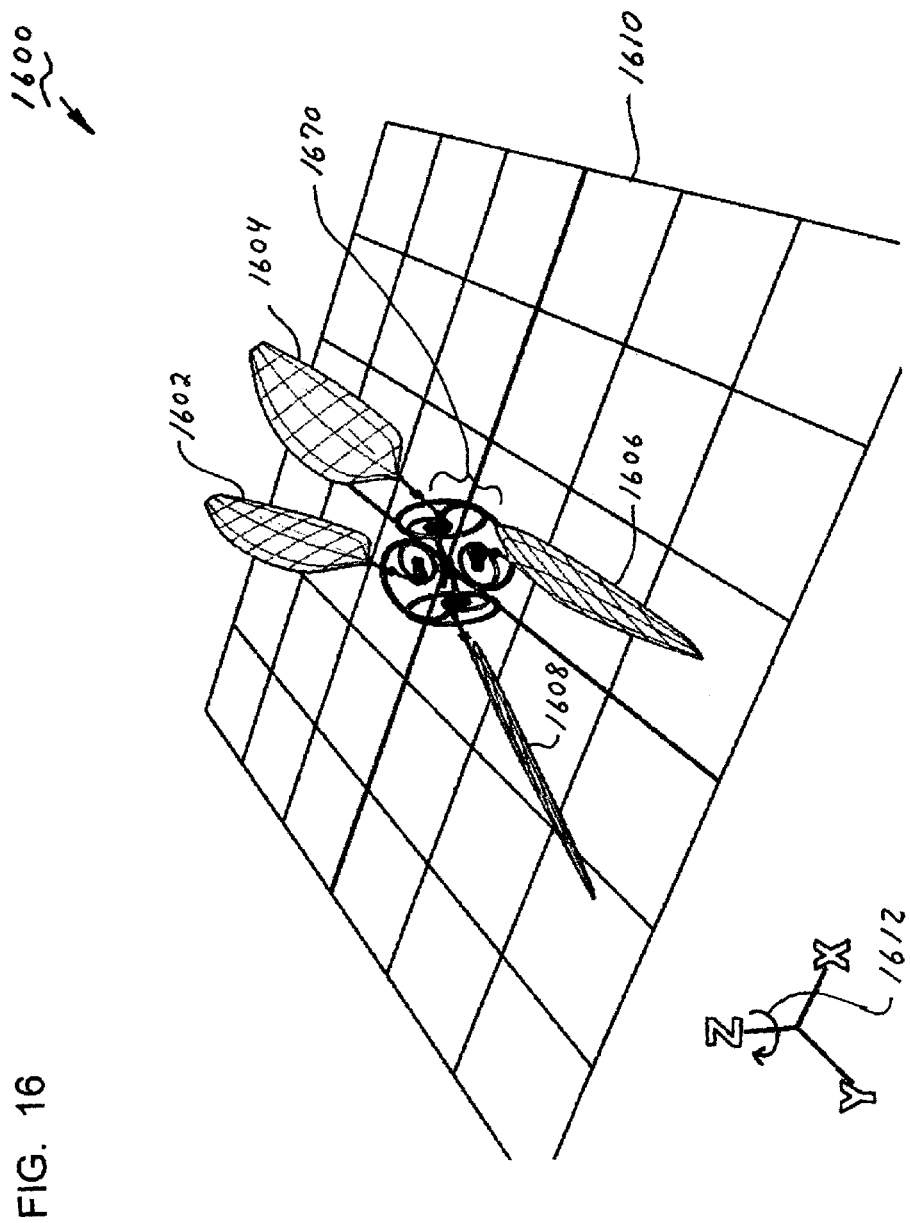
FIG. 16 shows rotation about the Z axis, according to one embodiment.

FIG. 16 shows rotation about the Z axis, according to one embodiment, generally at 1600. With reference to FIG. 16, a chassis 1670 has four wing members attached thereto: a wing member 1602, a wing member 1604, a wing member 1606, and a wing member 1608. In one embodiment, the wing member 1602 and the wing member 1604 form a first wing group. The motion of the wing members 1602 and 1604 is substantially in phase. The wing member 1606 and the wing member 1608 form a second wing group. The motion of the wing members 1606 and 1608 is substantially in phase. The stroke planes of all the wing members, 1602, 1604, 1606, and 1608 can be parallel to the Z axis. The motion between the two wing groups is substantially out of phase by one-half cycle; thereby equal and opposite forces are applied to the chassis 1670 resulting in a rotation 1612 about the Z axis.

Figure 17A:
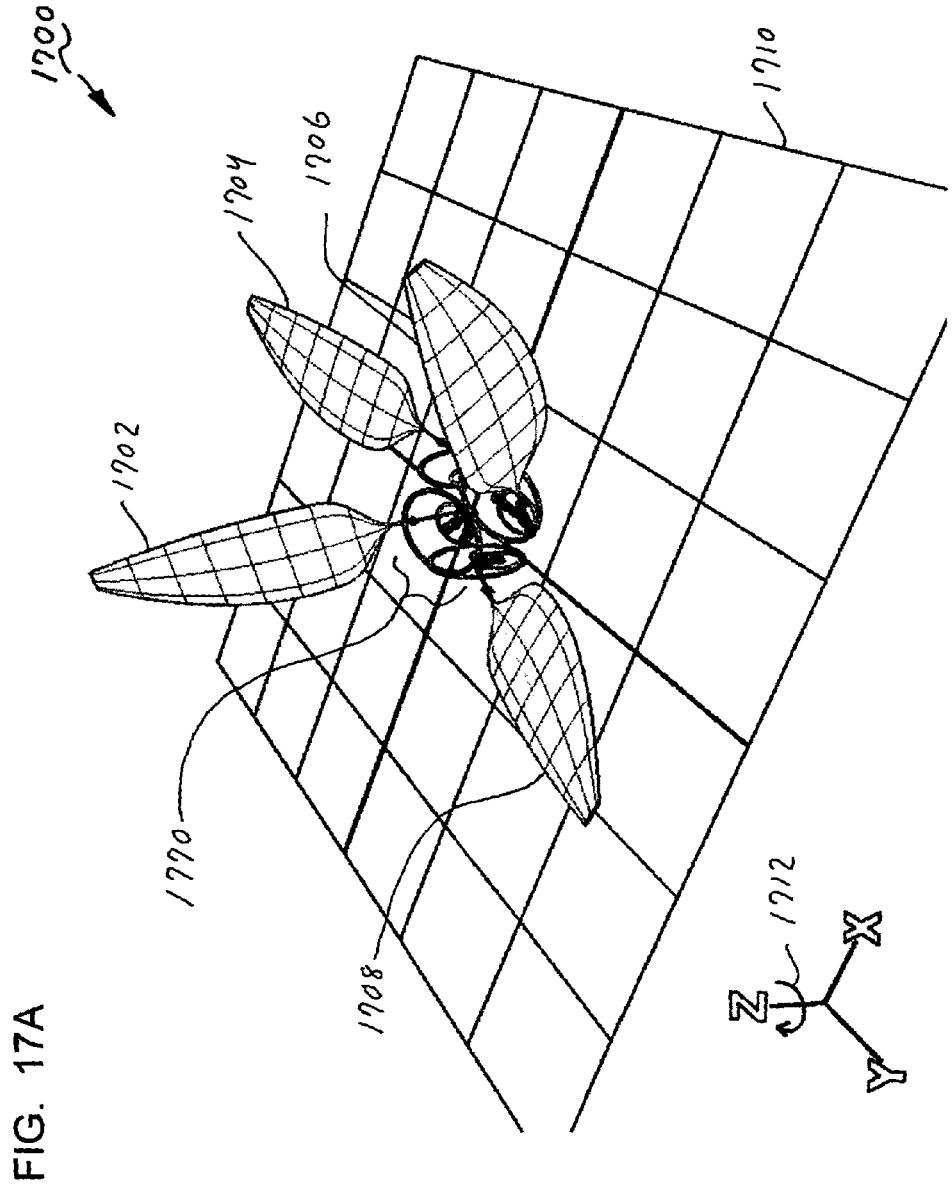
FIG. 17A shows rotation about the Z axis, according to one embodiment.

FIG. 17A shows rotation about the Z axis, according to one embodiment. With reference to FIG. 17A, a chassis 1770 has four wing members attached thereto: a wing member 1702, a wing member 1704, a wing member 1706, and a wing member 1708. In one embodiment, the wing member 1702 and the wing member 1704 form a first wing group. The motion of the wing members 1702 and 1704 is out of phase by a first phase angle. The wing member 1706 and the wing member 1708 form a second wing group. The motion of the wing members 1706 and 1708 is out of phase by the first phase angle. The stroke planes of the wing members 1702 and 1704 are at a first stroke plane angle and the stroke planes of wing members 1706 and 1708 are at the negative first stroke plane angle. The motion between the two wing groups is substantially out of phase by one-quarter cycle; thereby, equal and opposite forces are applied to the chassis 1770 resulting in a rotation 1712 about the Z axis.

Figure 17B:
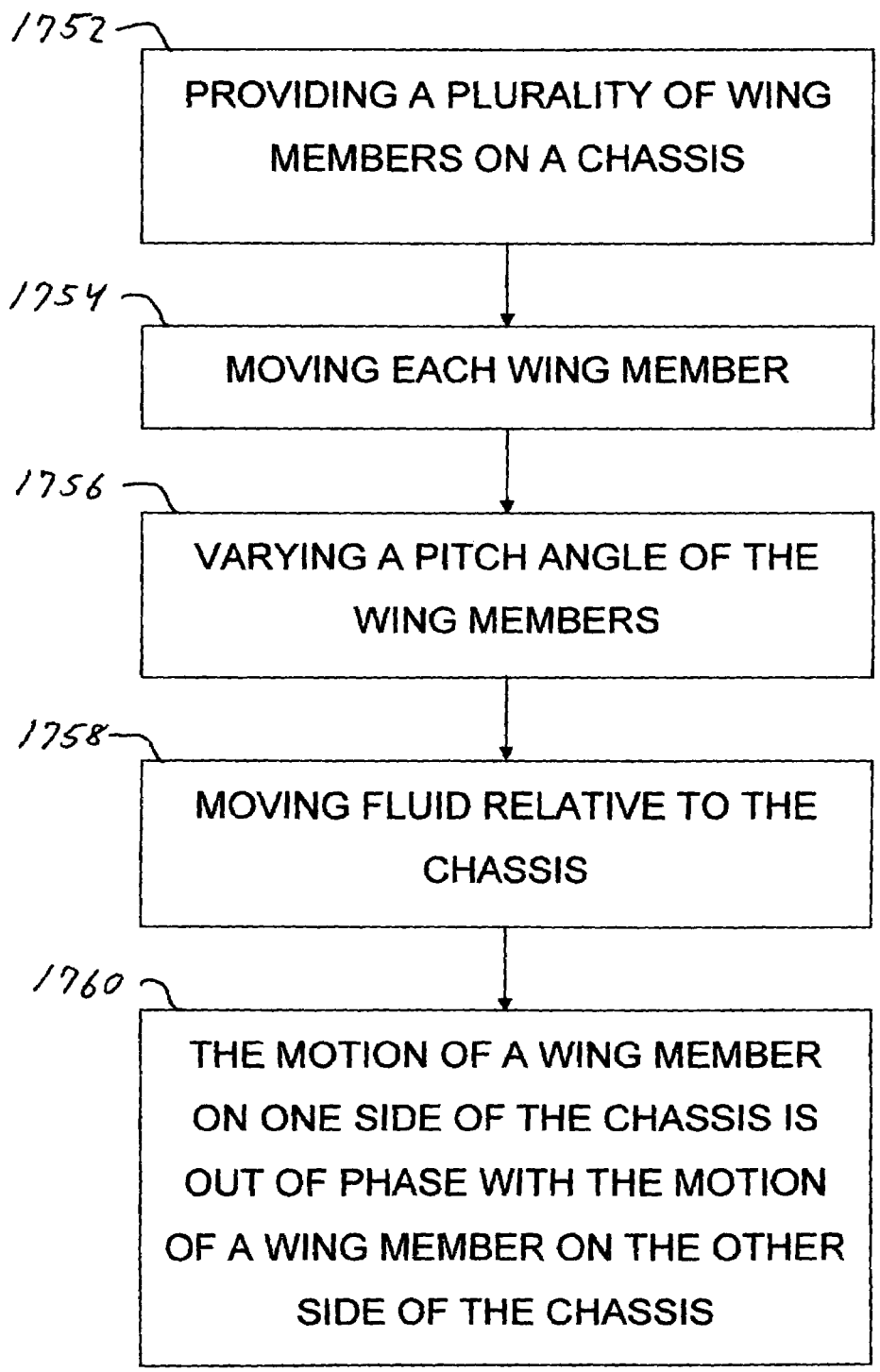
FIG. 17B illustrates a process for flight according to yet another embodiment.

FIG. 17B illustrates a process for flight according to yet another embodiment. With reference to FIG. 17B, at block 1752 a plurality of wing members is provided on a chassis. In various embodiments, the wing members can be arranged in wing pairs or groups or simply distributed on the chassis. At block 1754, each wing member is moved in oscillatory motion within a stroke plane. At block 1756, a pitch angle of a wing member is varied. At block 1758, fluid is moved relative to the chassis by the wing members. At block 1760, the motion of a wing member on a first side of a chassis is substantially out of phase by 180 (one hundred eighty) degrees with the motion of a corresponding wing member on a second side of a chassis. In various embodiments, the process of FIG. 17B is used for turning while in flight.

It will be noted that there can be any number of wing members attached to a chassis. The pitch angles and/or stoke planes of each wing member can be varied to provide for the desired flight characteristic of the chassis. For example, currents in the fluid that the chassis/wing members are immersed in may require instantaneous variation of one or more wing member parameters (pitch angle, stroke plane) to compensate for drift relative to a ground reference plane, such as the ground reference plane 1610 (FIG. 16) or 1710 (FIG. 17).

Figure 18A:
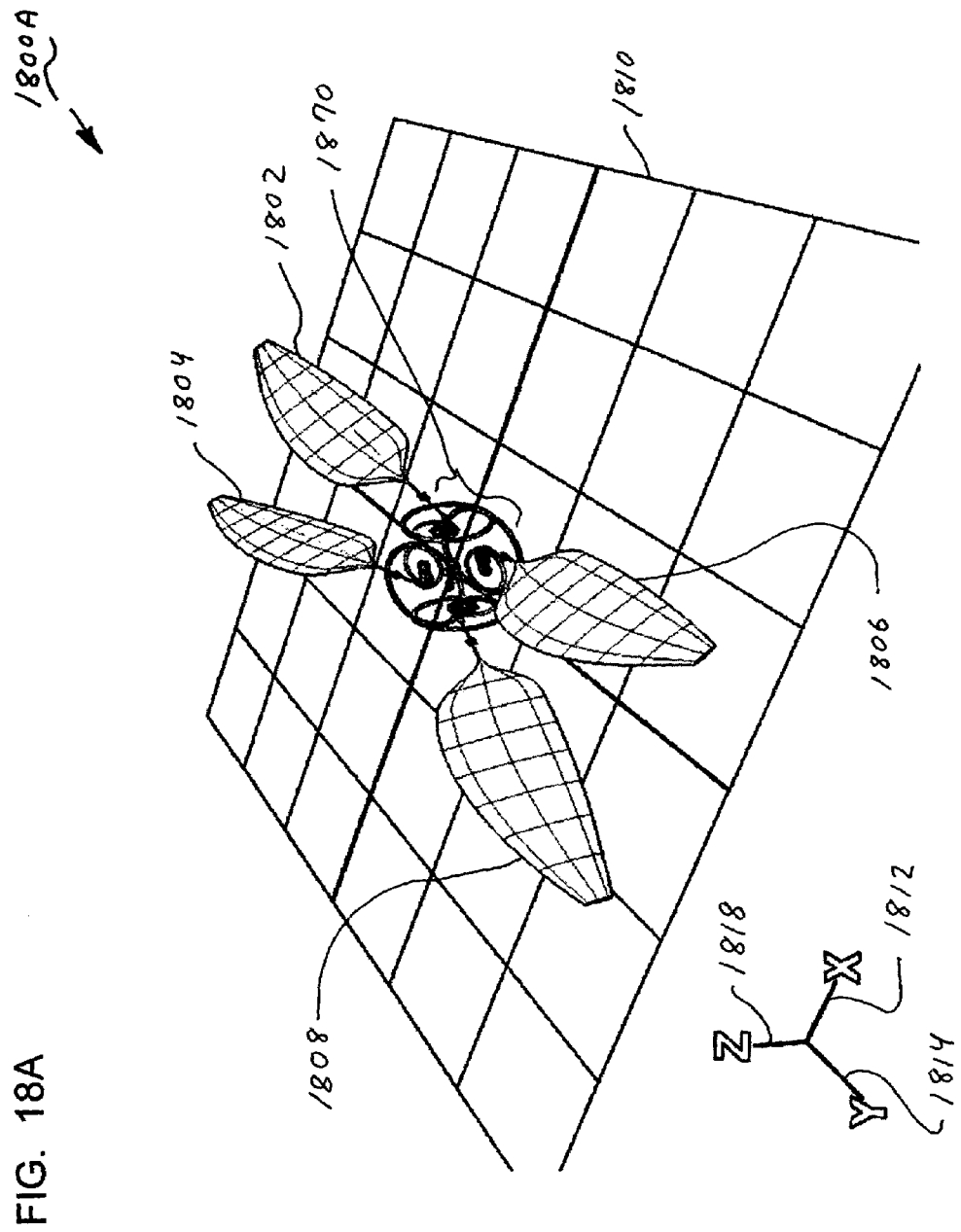
FIG. 18A illustrates forward flight, according to another embodiment.

FIG. 18A illustrates forward flight according to another embodiment, generally at 1800A. A chassis 1870 has four wing members: 1802, 1804, 1806, and 1808 attached thereto and configured for oscillatory motion in two wing groups.

The wing member 1802 and the wing member 1804 form a first wing group and the wing member 1806 and the wing member 1808 form a second wing group. The motion of the wing members within a wing group is substantially in phase and the motion of the wing groups is substantially mirrored about the Z axis when viewed in the YZ plane. The wing members 1802, 1804, 1806, and 1808 oscillate in stroke planes that are configured at an angle between 0 (zero) and 90 (ninety) degrees relative to a horizontal plane of the chassis 1870. In one embodiment, the stroke planes are configured at a 45 (forty-five) degree angle relative to a horizontal plane of the chassis 1870.

Figure 18B:
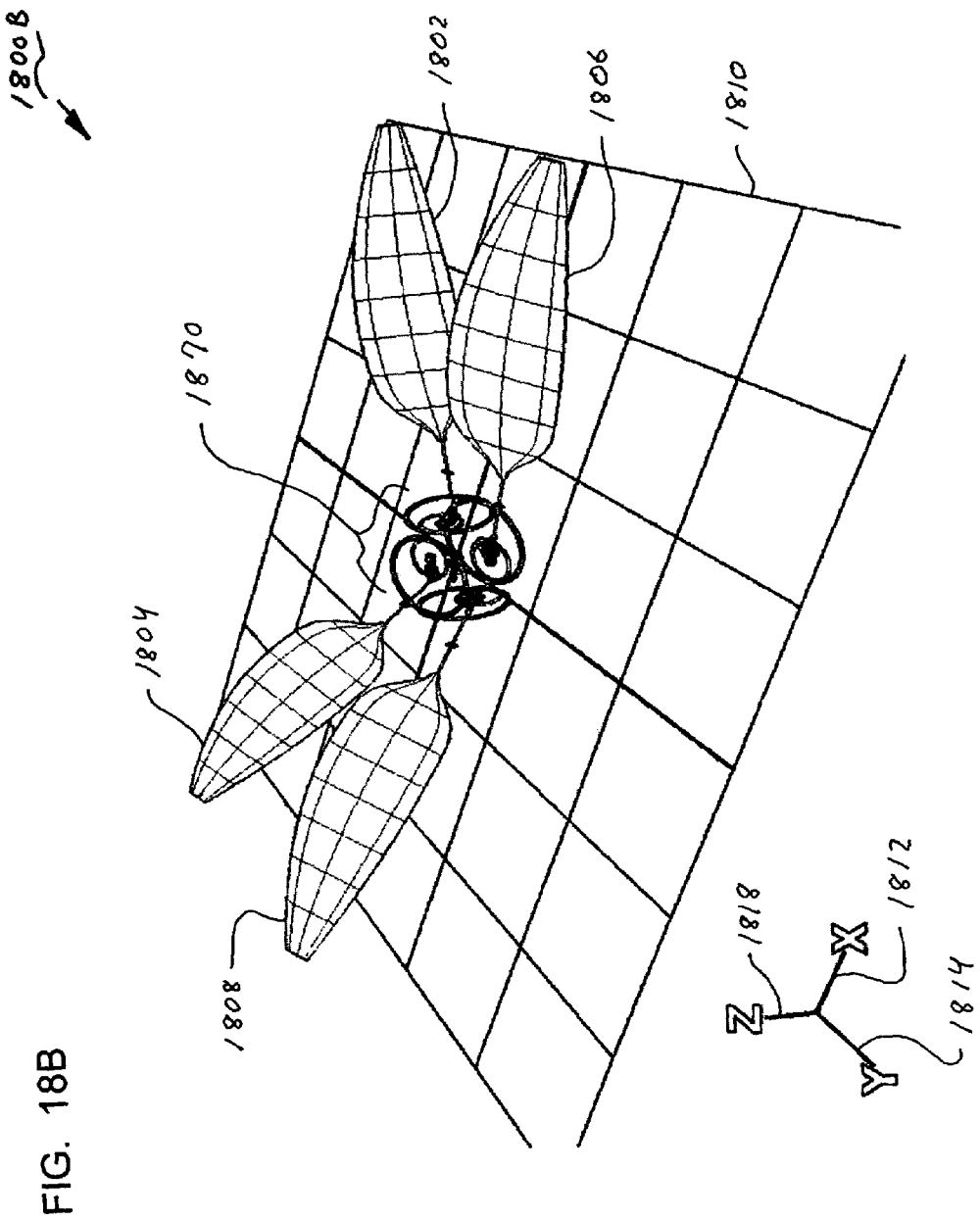
FIG. 18B illustrates translation in the positive Y direction, according to another embodiment.

FIG. 18B illustrates translation in the positive Y direction, according to another embodiment, generally at 1800B. With reference to FIG. 18B, the positions indicated by the wing members 1802, 1804, 1806, and 1808 illustrate another snapshot of the continuous motion exhibited by the wing members as the chassis 1870 translates along the positive Y direction at 1814.

Figure 18C:
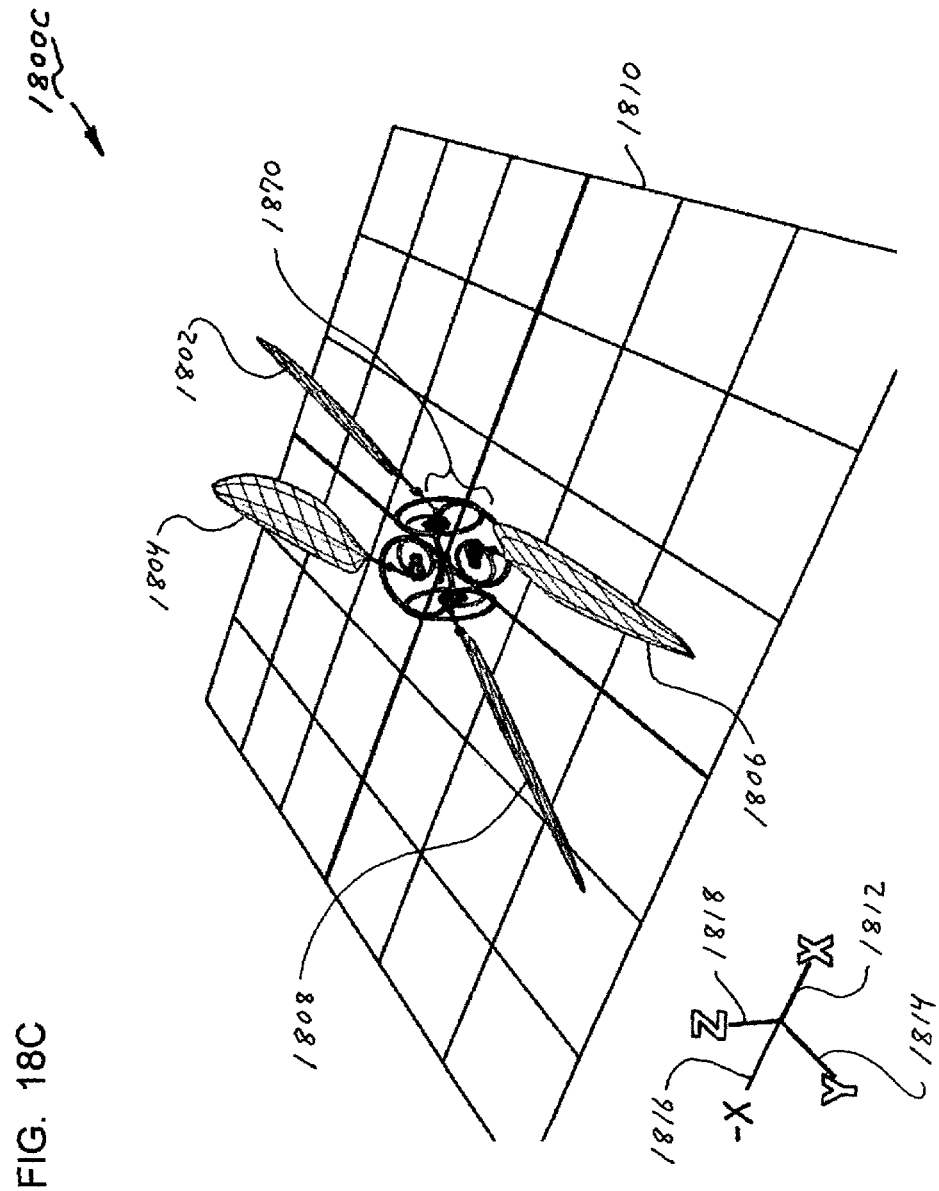
FIG. 18C illustrates translation in the negative X direction, according to another embodiment.

FIG. 18C illustrates translation in the negative X direction, according to another embodiment, generally at 1800C. With reference to FIG. 18C, the positions indicated by the wing members 1802, 1804, 1806, and 1808 illustrate another snapshot of the continuous motion exhibited by the wing members as the chassis 1870 translates along the negative X direction at 1816.

In one embodiment, the views provided at FIG. 18A, FIG. 18B, and FIG. 18C can represent a single turn or a series of turns resulting in a 180 (one hundred and eighty) degree change in direction of the chassis 1870 without rotating the chassis 1870 about the Z axis 1818. Such a turn can be accomplished by changing the stroke plane angles and pitch angles of the wing members 1802, 1804, 1806, and 1808 while in flight. In one embodiment, the chassis transitions from translational motion to a hover. In one embodiment, such a transition can be accomplished by adjusting the pivot positions of the wing members, as described above in conjunction with the previous figures, wherein the wing groups are ungrouped to form uniformly spaced wing members during a hover and then the wing members are "regrouped" to provide translation of the chassis 1870 in the positive Y direction 1814 without rotation, as seen by comparing the wing member grouping in FIG. 18A as compared with the wing member grouping in FIG. 18B. A similar regrouping of the wing members is observed by comparing the wing member grouping in FIG. 18B as compared with the wing member grouping in FIG. 18C.

In FIG. 18A wing members 1802 and 1804 form one group and wing members 1806 and 1808 form another group. Wing members are regrouped in FIG. 18B when wing members 1806 and 1802 form one wing group and wing members 1808 and 1804 form another wing group. As described above, the regrouping of wing members enables the chassis to change a direction of translation from the positive X direction 1812 to the positive Y direction 1814 without rotation about the Z axis 1818.

It will be noted that another regrouping of wing members occurs between FIG. 18B and FIG. 18C, which enables the chassis to change a direction of translation from the positive Y direction 1814 to the negative X direction 1816 without rotation about the Z axis 1818.

In yet another embodiment, a flight maneuver changes a direction from translation in a first direction (FIG. 18A) to a second direction (FIG. 18C) by changing the stroke plane angles of the wing members 1802, 1804, 1806, and 1808 with or without an accompanying change in pitch angles of the wing members 1802, 1804, 1806, and 1808.

It will be noted by those of skill in the art that variations in pitch angle and/or stroke plane angle might be necessary to maintain a stable flight path between the chassis 1870 and a ground reference plane 1810. In one or more embodiments, variations in pitch angle of any one or more of wing members 1802, 1804, 1806 or 1808 can be accomplished by instantaneous adjustment of the first axle 303 (FIG. 3C) relative to the chassis 360 (FIG. 3C). In one or more embodiments, variations in a stroke plane of any one or more of wing members 1802, 1804, 1806 or 1808 can be accomplished by instantaneous adjustment of the first tube 302 (FIG. 3C) relative to the chassis 350 (FIG. 3C).

It will be noted that there can be any number of wing members attached to a chassis. The pitch angles and/or stoke planes of each wing member can be varied to provide the desired flight characteristics of the chassis. For example, currents in the fluid that the chassis/wing members are immersed in may require instantaneous variation of one or more wing member parameters (pitch angle, stroke plane) to compensate for drift relative to a ground reference plane, such as the ground reference plane 1810 (FIG. 18A-C).

Various other maneuvers can be accomplished by adjusting wing member parameters such as the stroke plane angle or the pitch angle of the wing members. For example, pitching a front portion of a chassis in a climbing direction away from a ground reference plane can be accomplished in a variety of ways. In a first way, the oscillation speed of the wing members in the "front" is increased relative to the oscillation speed of the wing members in the "back." As used in herein, "front" denotes the wing members that are forward of the center of gravity of the chassis, wherein forward is used to denote a direction of travel. As used herein, "back" denotes the wing members that are rearward of the center of gravity of the chassis. In a second way, a pitch angle of the "front" wing members is increased relative to a pitch angle of the "rear" wing members. In a third way, the motion of the "front" wing members is altered to move in more of a hover than the motion of the "rear" wing members.

In another example, pitching the front portion of a chassis down in a descending direction toward a ground reference plane can be accomplished in a variety of ways. In a first way, the oscillation speed of the wing members in the "front" is decreased relative to the oscillation speed of the wing members in the "back." In a second way, a pitch angle of the "front" wing members is decreased relative to the pitch angle of the "rear" wing members. In a third way, the motion of the "rear" wing members is altered to be more of a hover than the motion of the "front" wing members.

A number of maneuvers through a fluid has been described with the use of the preceding figures. Those of skill in the art will recognize that additional maneuvers are possible within the description of embodiments presented herein. Accordingly, all such maneuvers through a fluid are considered to be within the scope of this description of embodiments.

The apparatuses and methods described herein are readily adapted to a variety of fluids such as air, water, etc. As such, wing areas and oscillation speeds of the wing members will be adjusted to produce a required amount of lift and propulsive force necessary to move a particular chassis in or through a particular fluid. Those of skill in the art will appreciate that, in general, less dense fluids such as air will require more wing area, more wing members, higher oscillation speeds, etc. than more dense fluids such as water.

For purposes of discussing and understanding this description, it is to be understood that various terms are used by those knowledgeable in the art to describe techniques and approaches. Furthermore, in this description for purposes of explanation, numerous specific details are set forth in order to provide a thorough understanding. It will be evident, however, to one of ordinary skill in the art, that embodiments of the invention may be practiced without these specific details. In some instances, well-known structures and devices are shown in simplified form, rather than in detail, in order to avoid obscuring embodiments of the invention. These embodiments are described in sufficient detail to enable those of ordinary skill in the art to practice the invention, and it is to be understood that other embodiments may be utilized and that logical, mechanical, electrical, and other changes may be made without departing from the scope of the invention.

As used in this description, "one embodiment" or "an embodiment" or similar phrases means that the feature(s) being described is included in at least one embodiment of the invention. References to "one embodiment" in this description do not necessarily refer to the same embodiment; however, neither are such embodiments mutually exclusive. Nor does "one embodiment" imply that there is but a single embodiment of the invention. For example, a feature, structure, act, etc. described in "one embodiment" may also be included in other embodiments. Thus, the invention may include a variety of combinations and/or integrations of the embodiments described herein.

While the invention has been described in terms of several embodiments, those of skill in the art will recognize that the invention is not limited to the embodiments described, but can be practiced with modification and alteration within the spirit and scope of the appended claims. Thus, the description is to be regarded as illustrative instead of limiting and the scope of the invention is defined only by the appended claims.

What is claimed is:

1. A method comprising:
   rotating a first member about a first point, wherein the first member is rotatably coupled to a second member at a second point;
   counter-rotating the second member at a rotational speed that is related to the rotating wherein the second member is rotatably coupled to a third member at a third point;
   translating the third point in oscillatory motion along a path wherein the translating is responsive to the counter-rotating; and
   pivoting the third member at a fourth point.

2. The method of claim 1, wherein the rotational speed of the second member is twice the rotational speed of the first member.

3. The method of claim 1, further comprising:
   moving the third member through a fluid wherein a force is imparted to the third member.

4. The method of claim 3, wherein the fluid is air.

5. The method of claim 3, wherein the fluid is water.

6. The method of claim 1, further comprising:
   changing a stroke path angle of the third member while the third point is being translated in oscillatory motion.

7. The method of claim 1, further comprising:
   varying a pitch angle of the third member during the counter-rotating.

8. The method of claim 7, further comprising:
   moving the third member through a fluid wherein a force is imparted to the third member.

9. The method of claim 8, wherein the fluid is air.

10. The method of claim 9, wherein the fluid is water.

11. The method of claim 7, wherein the varying provides a pitch angle that is constant.

12. The method of claim 7, wherein the varying provides a pitch angle that changes.

13. The method of claim 12, wherein the oscillatory motion includes a first direction and a second direction.

14. The method of claim 12, further comprising:
    reversing a direction of the third member from the first direction to the second direction while varying a pitch angle of the third member as the third member moves through a fluid;
    setting a fluid into motion due to the motion of the third member; and
    imparting a force to the third member, wherein the force results from the interaction of the third member and the fluid.

15. The method of claim 14, wherein the fluid is air.

16. The method of claim 14, wherein the fluid is water.

17. The method of claim 1, further comprising:
    making a distance between the first point and the second point equivalent to a distance between the second point and the third point so that the path is linear.

18. The method of claim 1, further comprising:
    changing a location of the fourth point.

19. The method of claim 18, wherein a dihedral angle of the third member is altered by the changing.

20. The method of claim 18, wherein a wing shaft angle is altered by the changing.

21. An apparatus comprising:
    a first member, the first member rotatably coupled to a chassis at a first point;
    a second member, the second member rotatably coupled to the first member at a second point, wherein rotation of the first member can cause the second member to counter-rotate at a rotational speed that is related to rotation of the first member and a third point, located on the second member, can move in oscillatory motion along a path relative to the chassis in response to rotation of the first member; and
    a third member, the third member is rotatably coupled to the second member at the third point, and the third member is pivotally supported at a fourth point by mechanical connection to the chassis.

22. The apparatus of claim 21, wherein the rotational speed of the second member is twice a rotational speed of the first member.

23. The apparatus of claim 21, wherein the third member can move within a plane and a wing portion of the third member can interact with the fluid such that a lift force is imparted to the chassis.

24. The apparatus of claim 23, wherein the fluid is air.

25. The apparatus of claim 23, wherein the fluid is water.

26. The apparatus of claim 21, wherein a stroke plane angle between the linear path and the chassis can be changed by changing an angle between the first member and the second member wherein the angle is referenced to an arbitrary orientation of the first member with respect to the chassis.

27. The apparatus of claim 21, wherein a pitch angle of a wing portion of the third member is a function of a stroke position of the third member.

28. The apparatus of claim 27, wherein the function provides for a constant pitch angle.

29. The apparatus of claim 27, wherein the function provides for a variable pitch angle.

30. The apparatus of claim 29, wherein two non-circular gears are used to provide a variable pitch angle and the two non-circular gears are configured to rotate about axes different from their geometric centers.

31. The apparatus of claim 30, wherein the two non-circular gears are elliptical.

32. The apparatus of claim 21, further comprising;
a power source, the power source is configured to rotate the first member about the first point.

33. The apparatus of claim 21, wherein a distance between the first point and the second point is equal to a distance between the second point and the third point, wherein the path is a linear path.

34. The apparatus of claim 21, further comprising:
an inner circular member having a center of rotation coincident with the second point, the inner circular member is coupled to the second member; and
an outer circular member having a geometric center coincident with the first point, the outer circular member is coupled to the chassis and the inner circular member is configured for aligned rolling contact within the outer circular member.

35. The apparatus of claim 21, further comprising:
a pivotal support, the pivotal support is configured to support the third member at the fourth point and the pivotal support can be moved from a first location to a second location.

36. The apparatus of claim 35, wherein a dihedral angle of a wing portion of the third member is changed.

* * * * *